US012688683B2

(12) United States Patent
Dennis et al.

(10) Patent No.: US 12,688,683 B2
(45) Date of Patent: Jul. 21, 2026

(54) METHOD AND SYSTEM FOR OPTIMIZATION OF A HUMAN-MACHINE TEAM FOR GEOGRAPHIC REGION DIGITIZATION

(71) Applicant: The Government of the United States of America, as represented by the Secretary of the Navy, Arlington, VA (US)

(72) Inventors: Steven M. Dennis, Covington, LA (US); Christopher J. Michael, Covington, LA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 163 days.

(21) Appl. No.: 18/655,964

(22) Filed: May 6, 2024

(65) Prior Publication Data

US 2024/0371145 A1 Nov. 7, 2024

Related U.S. Application Data

(60) Provisional application No. 63/463,981, filed on May 4, 2023.

(51) Int. Cl.
    *G06V 10/778*      (2022.01)
    *G06V 10/44*      (2022.01)
    (Continued)

(52) U.S. Cl.
    CPC ........ *G06V 10/7788* (2022.01); *G06V 10/449* (2022.01); *G06V 10/771* (2022.01); *G06V 10/7715* (2022.01); *G06V 20/10* (2022.01)

(58) Field of Classification Search
    CPC ............. G06V 10/7788; G06V 10/449; G06V 10/771; G06V 10/7715; G06V 20/10
    See application file for complete search history.

(56) References Cited

U.S. PATENT DOCUMENTS

2024/0330690 A1* 10/2024 Tang ...................... G06N 3/084

FOREIGN PATENT DOCUMENTS

CN      111008644 B   *   4/2023   ......... G06F 18/241

OTHER PUBLICATIONS

"Edwin God et. al., Mars Terrain Segmentation with Less Labels, 2022, 2022 IEEER Aerospace Conference" (Year: 2022).*

(Continued)

*Primary Examiner* — Chineyere Wills-Burns
*Assistant Examiner* — Phuong Hau Cai
(74) *Attorney, Agent, or Firm* — US Naval Research Laboratory; Nigel R. Fontenot

(57) ABSTRACT

A method that includes receiving a set of one or more images, each having one or more sets of pixels, receiving a ground truth value that a vertex point associated with a transition between two regions in a respective set of pixels, identifying a machine placement candidate vertex point for a first set of pixels, determining a set of one or more selected candidate features in the set of candidate features that maximizes an objective function that identifies an accuracy of the identified machine placement candidate vertex point compared to the respective ground truth for a respective set of pixels, updating a set of one or more basis features by adding the set of one or more selected candidate features that maximizes the objective function, and training a machine learning model based on the updated set of one or more basis features to identify additional vertex points for a transition.

21 Claims, 26 Drawing Sheets

(51) Int. Cl.
    *G06V 10/77*       (2022.01)
    *G06V 10/771*     (2022.01)
    *G06V 20/10*      (2022.01)

(56)               References Cited

OTHER PUBLICATIONS

"Takaki Yamada et. al., GeoCLR: Georeference Contrastive Learning for Efficient Seafloor Image Interpretation, Jun. 2022, Field Robotics" (Year: 2022).*

* cited by examiner

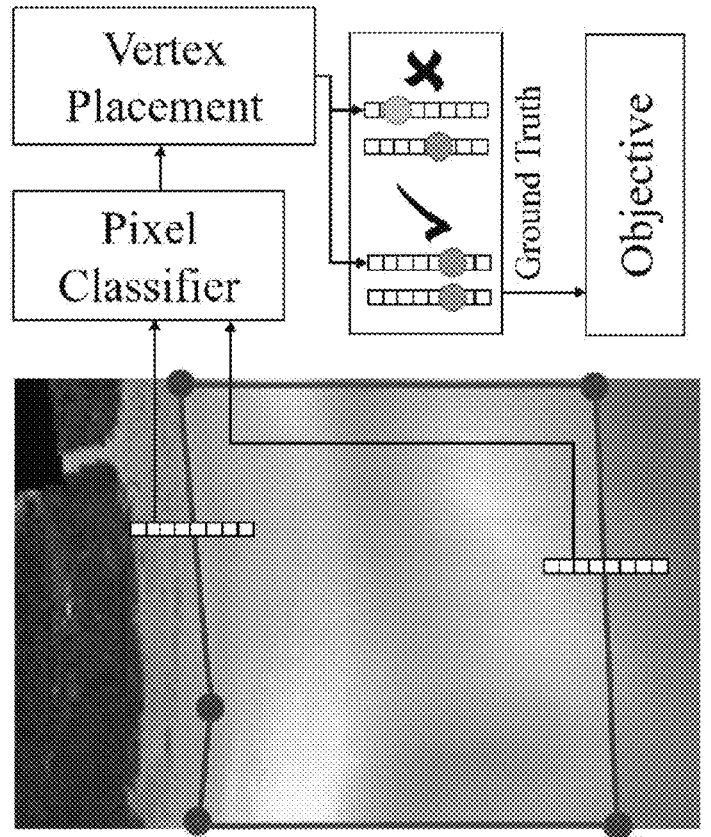
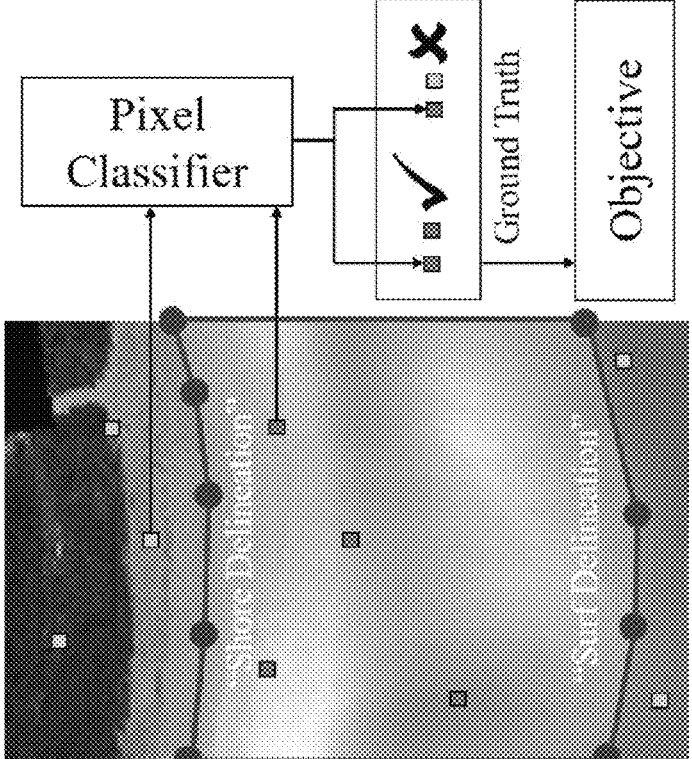
FIG. 3

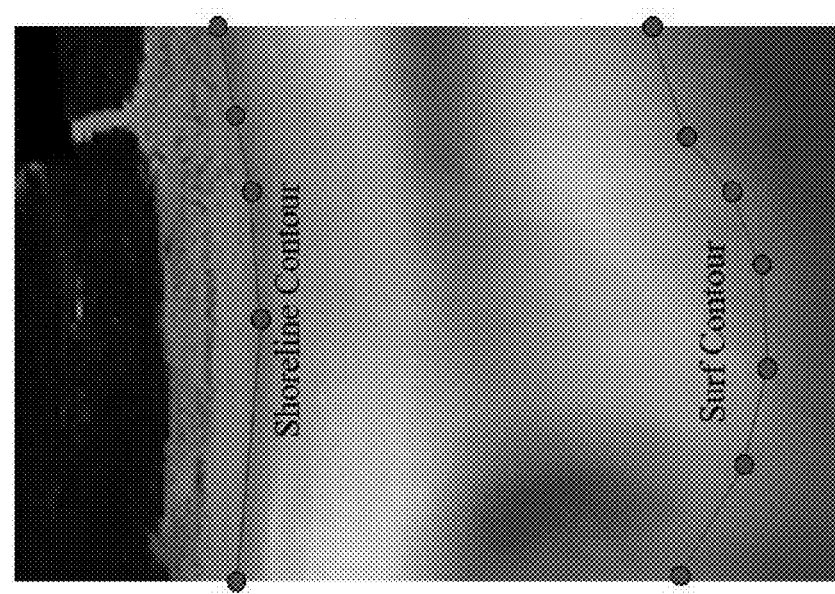
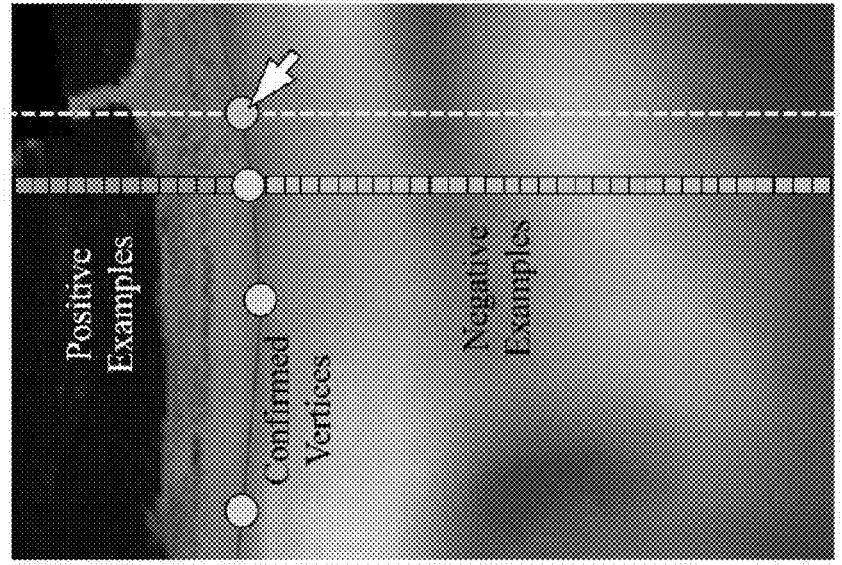
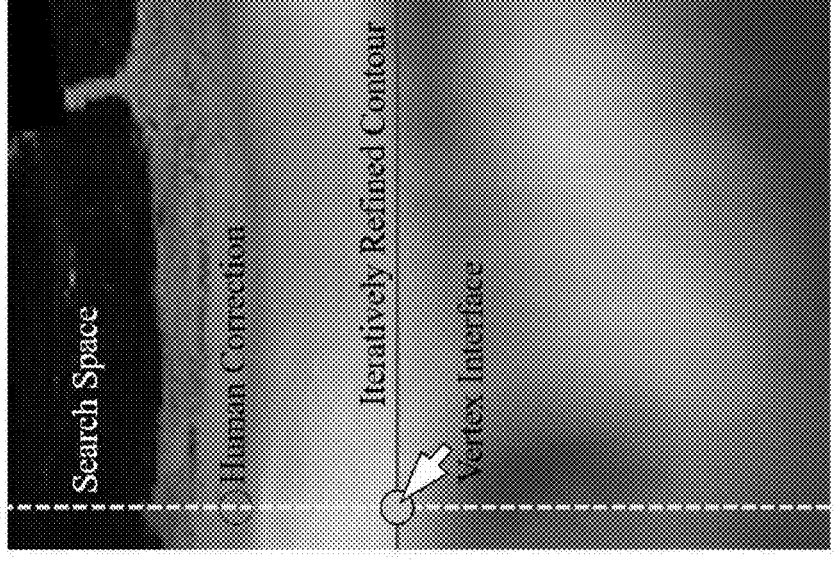
FIG. 5

900

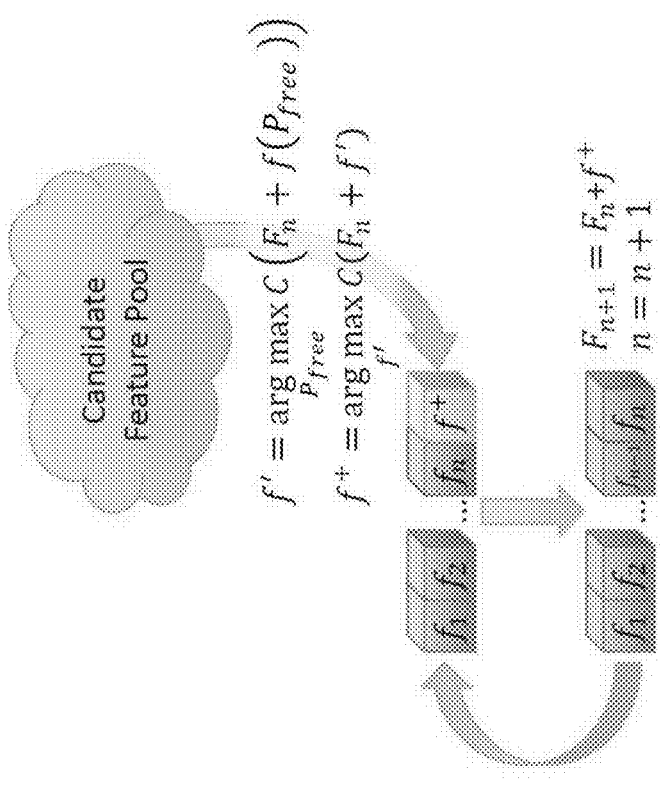
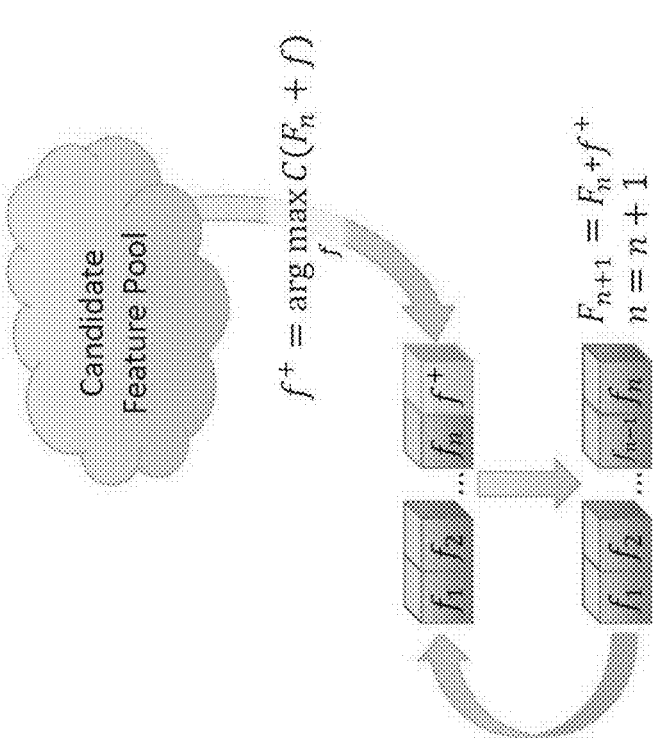
FIG. 12

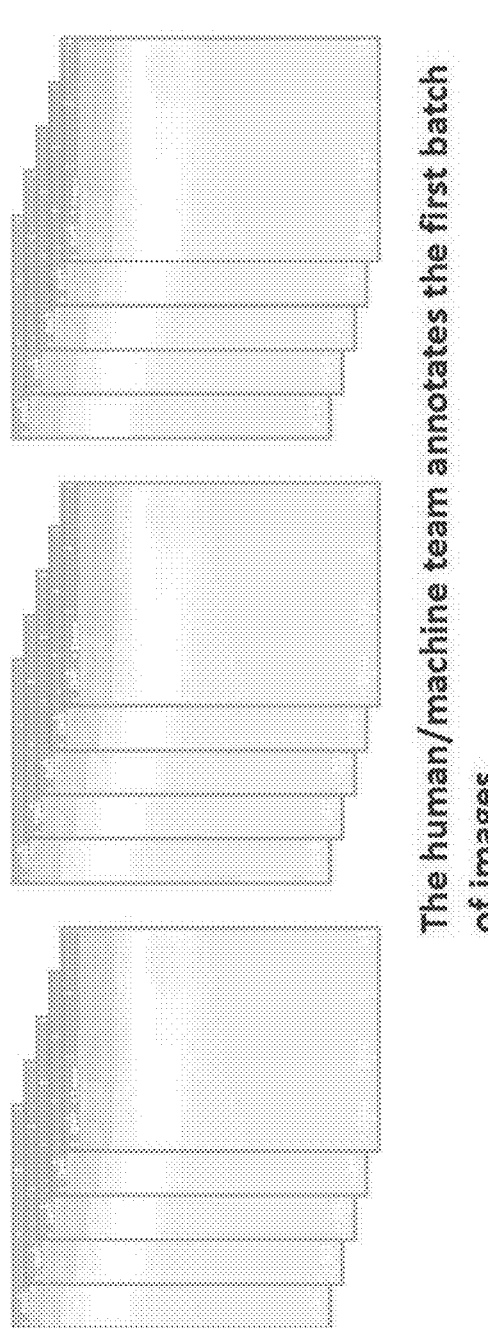
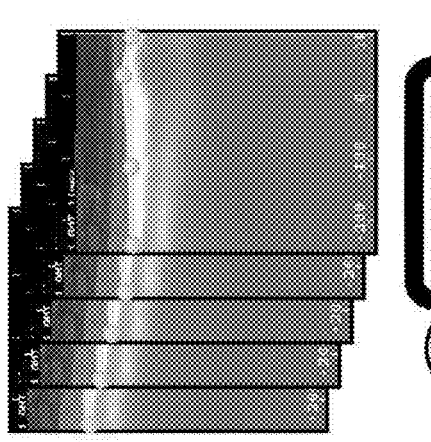
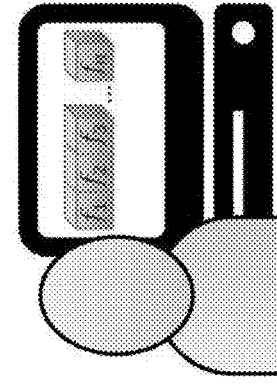
The human/machine team annotates the first batch of images
FIG. 25

While the human rests, the machine optimizes the feature set based upon the ground truth annotation Annotation of the next batch of images benefits from the improved feature set Optimization of the feature set occurs after every batch Optimize over the annotations of the last batch only, in order to react to *concept drift*

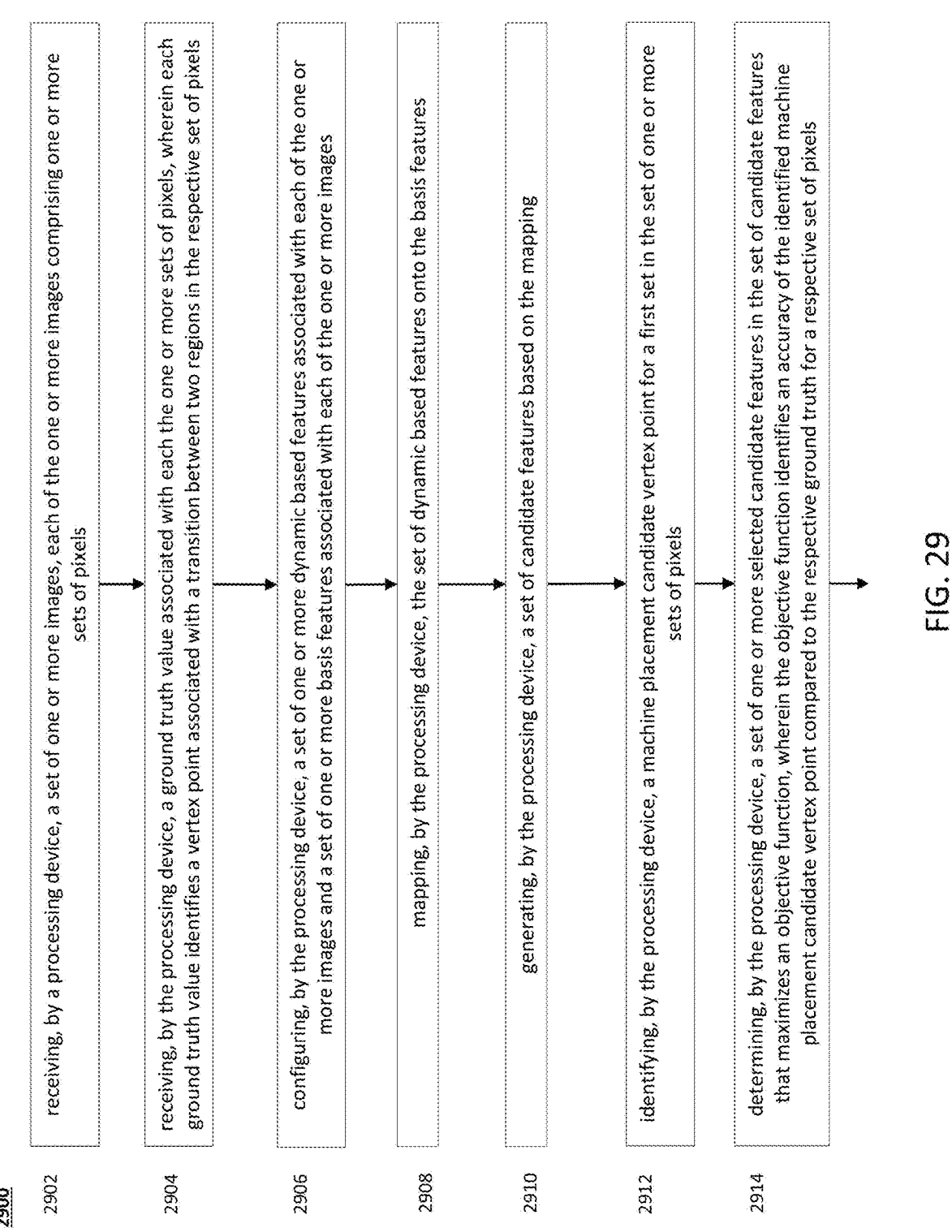

2900

2902    receiving, by a processing device, a set of one or more images, each of the one or more images comprising one or more sets of pixels 2904    receiving, by the processing device, a ground truth value associated with each the one or more sets of pixels, wherein each ground truth value identifies a vertex point associated with a transition between two regions in the respective set of pixels 2906    configuring, by the processing device, a set of one or more dynamic based features associated with each of the one or more images and a set of one or more basis features associated with each of the one or more images 2908    mapping, by the processing device, the set of dynamic based features onto the basis features 2910    generating, by the processing device, a set of candidate features based on the mapping 2912    identifying, by the processing device, a machine placement candidate vertex point for a first set in the set of one or more sets of pixels 2914    determining, by the processing device, a set of one or more selected candidate features in the set of candidate features that maximizes an objective function, wherein the objective function identifies an accuracy of the identified machine placement candidate vertex point compared to the respective ground truth for a respective set of pixels

FIG. 29

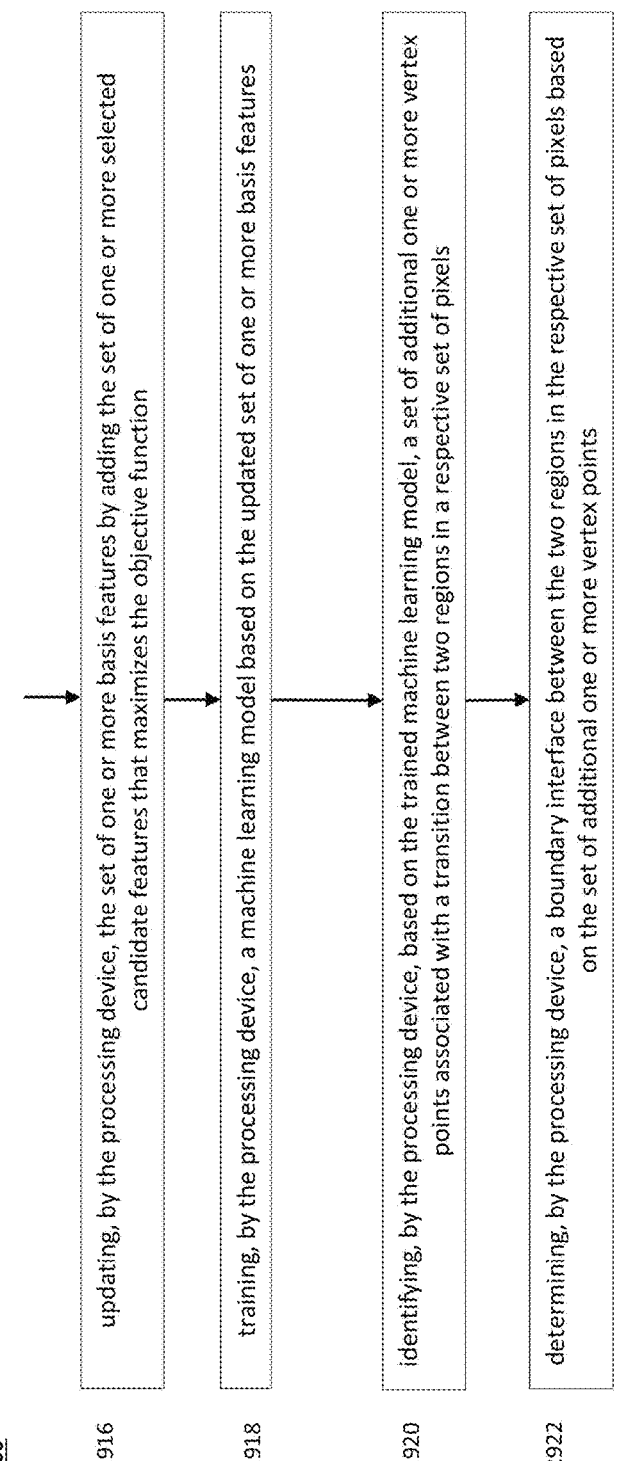

2900

2916 updating, by the processing device, the set of one or more basis features by adding the set of one or more selected candidate features that maximizes the objective function 2918 training, by the processing device, a machine learning model based on the updated set of one or more basis features 2920 identifying, by the processing device, based on the trained machine learning model, a set of additional one or more vertex points associated with a transition between two regions in a respective set of pixels 2922 determining, by the processing device, a boundary interface between the two regions in the respective set of pixels based on the set of additional one or more vertex points

FIG. 29 (cont.)

METHOD AND SYSTEM FOR OPTIMIZATION OF A HUMAN-MACHINE TEAM FOR GEOGRAPHIC REGION DIGITIZATION

CROSS-REFERENCE

This application is a nonprovisional application of and claims the benefit of priority under 35 U.S.C. § 119 based on U.S. Provisional Patent Application No. 63/463,981 filed on May 4, 2023. The Provisional application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; nrltechtran@us.navy.mil, referencing Navy Case #211494.

TECHNICAL FIELD

The present disclosure is related to, and more specifically to, but not limited to training machine learning model to identify geographic regions in a human-machine team.

BACKGROUND

Many automatic approaches for tasks involving human experts exist yet are not used often in practice. The widely demanded and laborious task of region digitization within geographic information systems (GIS) is a good example of this phenomenon. Digitization within GIS involves the tracing of geographic features such as land cover from remotely sensed images in order to generate maps, conduct surveys, and study the earth among other things. Although hundreds of approaches to automatic region digitization have been published [9,12], they are not widely adopted by geographers, physicists, geologists, and other geospatial analysts in practice. Presumably, this is due in large part to the lack of robust iterative approaches: automatic digitization suffers from many nuanced pitfalls that cause users frustration or lack of trust in the automation. Such pitfalls include lack of curated training data, inconsistencies between imagery outputs from multiple sources, fuzziness of feature boundaries, and lack of a single technique robust enough to cover all cases [9,12]. A human-machine team (HMT) for geographic region digitization has recently been reported to overcome problems with automatic approaches by implementing an iterative semi-automatic process [14]. The technique is able to provide 80% accuracy in vertex placement when digitizing land-water boundaries in small (4 images) remotely sensed persistent image sets. It implements a constrained human-computer interface (HCI) and a machine teammate driven by interactive machine learning, which mainly involves an instance-based online machine learning model for quick convergence in digitization accuracy and estimation of the probability of correct machine placement. However, the technique has difficulty scaling to large datasets due to O(log N) complexity and courser grained concept drift, or sudden changes in environmental conditions [5].

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present disclosure provides for a method that may include receiving, by a processing device, a set of one or more images, each of the one or more images comprising one or more sets of pixels, and receiving, by the processing device, a ground truth value associated with each the one or more sets of pixels, wherein each ground truth value identifies a vertex point associated with a transition between two regions in the respective set of pixels. The method may include configuring, by the processing device, a set of one or more dynamic based features associated with each of the one or more images and a set of one or more basis features associated with each of the one or more images, mapping, by the processing device, the set of dynamic based features onto the basis features, and generating, by the processing device, a set of candidate features based on the mapping. The method may include identifying, by the processing device, a machine placement candidate vertex point for a first set in the set of one or more sets of pixels, and determining, by the processing device, a set of one or more selected candidate features in the set of candidate features that maximize an objective function, wherein the objective function identifies an accuracy of the identified machine placement candidate vertex point compared to the respective ground truth for a respective set of pixels. The method may include updating, by the processing device, the set of one or more basis features by adding the set of one or more selected candidate features that maximize the objective function, and training, by the processing device, a machine learning model based on the updated set of one or more basis features. The method may include identifying, by the processing device, based on the trained machine learning model, a set of additional one or more vertex points associated with a transition between two regions in a respective set of pixels, and determining, by the processing device, a boundary interface between the two regions in the respective set of pixels based on the set of additional one or more vertex points.

BRIEF DESCRIPTION OF THE DRAWINGS

FIG. 3 illustrates an example of compositional interface schemata (CIS) compared to a more conventional optimization technique in accordance with one or more disclosed aspects.

FIG. 5 illustrates an example human-computer interface (HCI) in accordance with one or more disclosed aspects.

US 12,688,683 B2

3                                                        4

Figure 7:
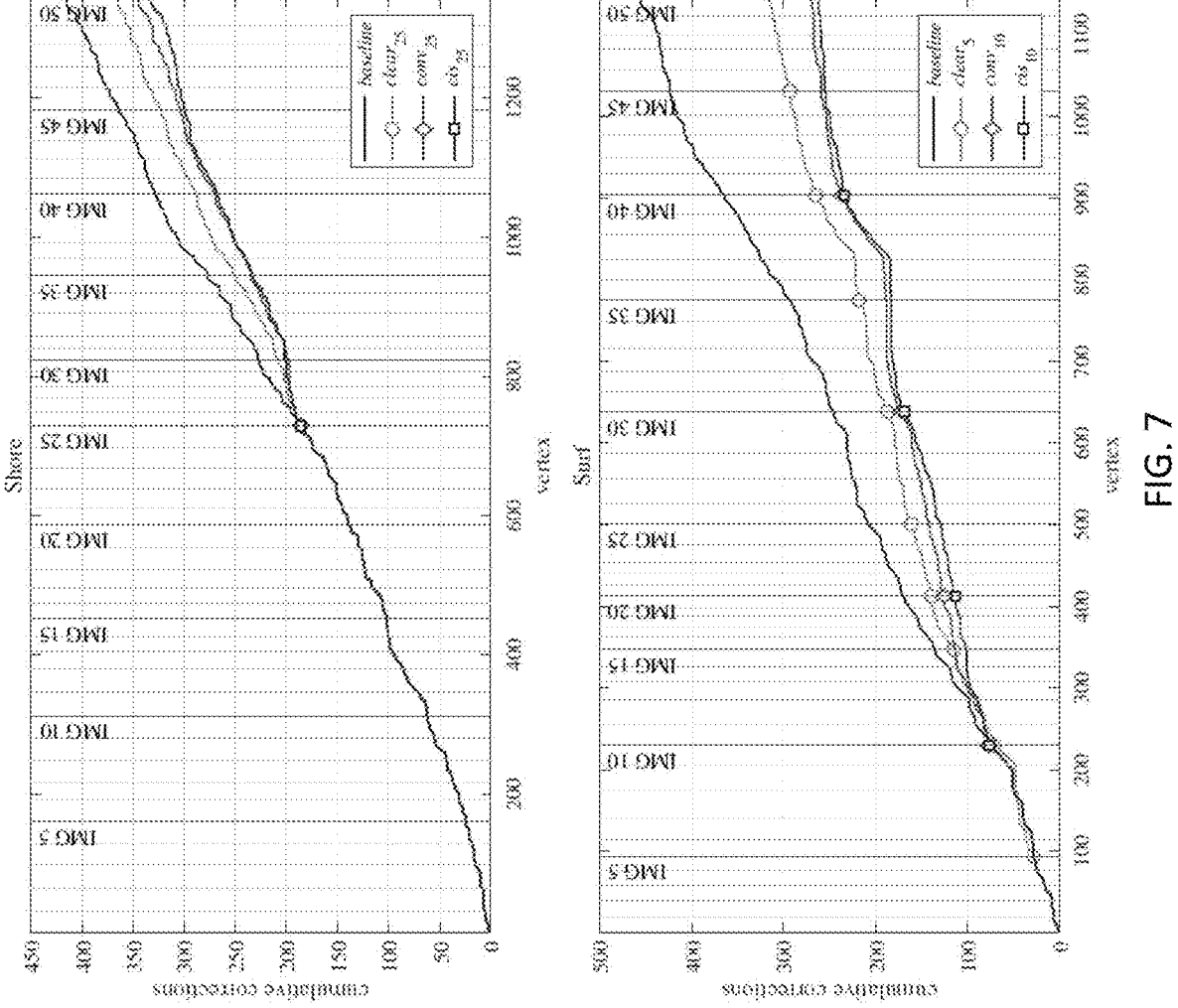

FIG. 7 illustrates example results for the vertex placement performance of the optimizers in accordance with one or more disclosed aspects.

Figure 8:
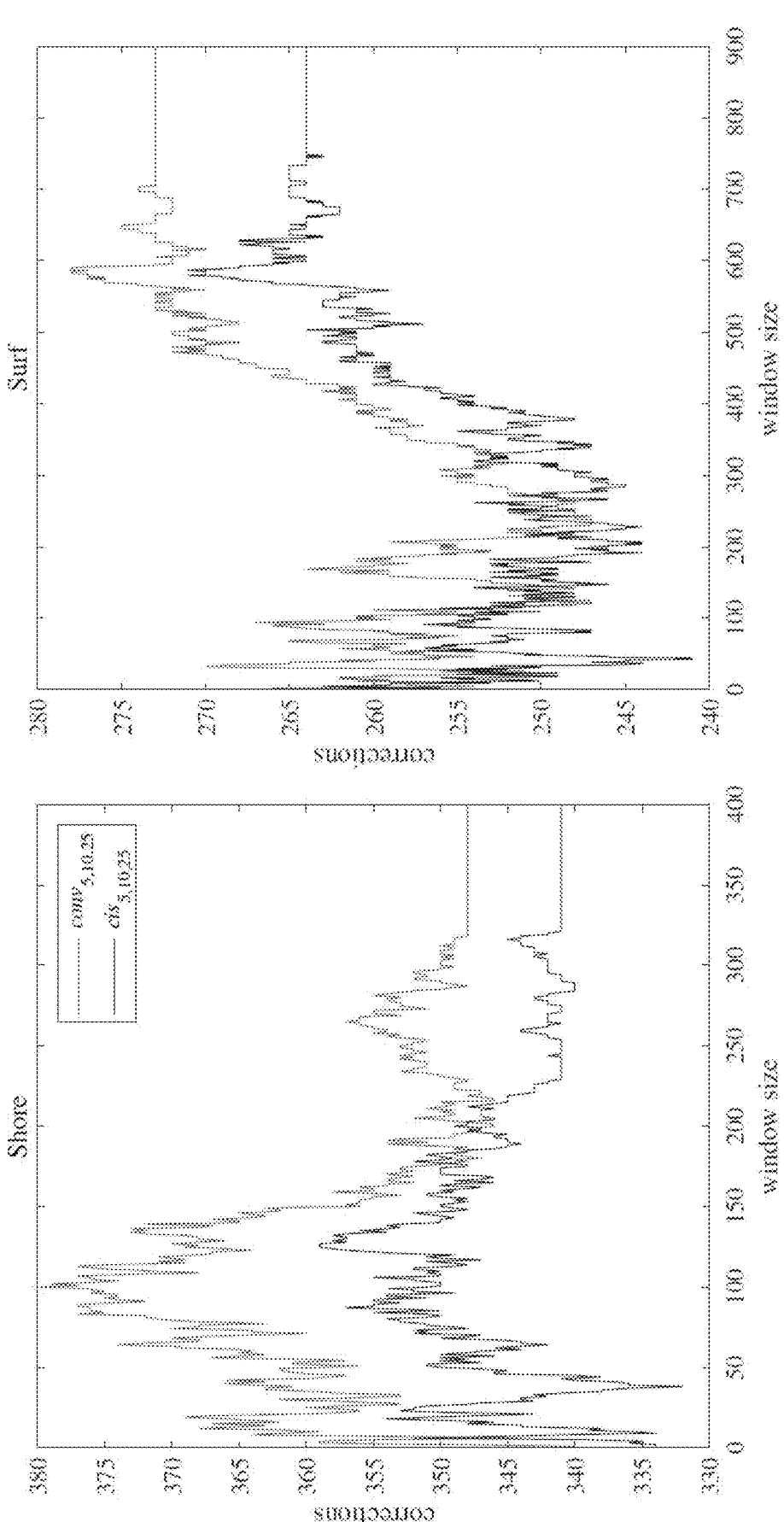

FIG. 8 illustrates example results for the online heuristic for optimizer selection in accordance with one or more disclosed aspects.

Figure 9:
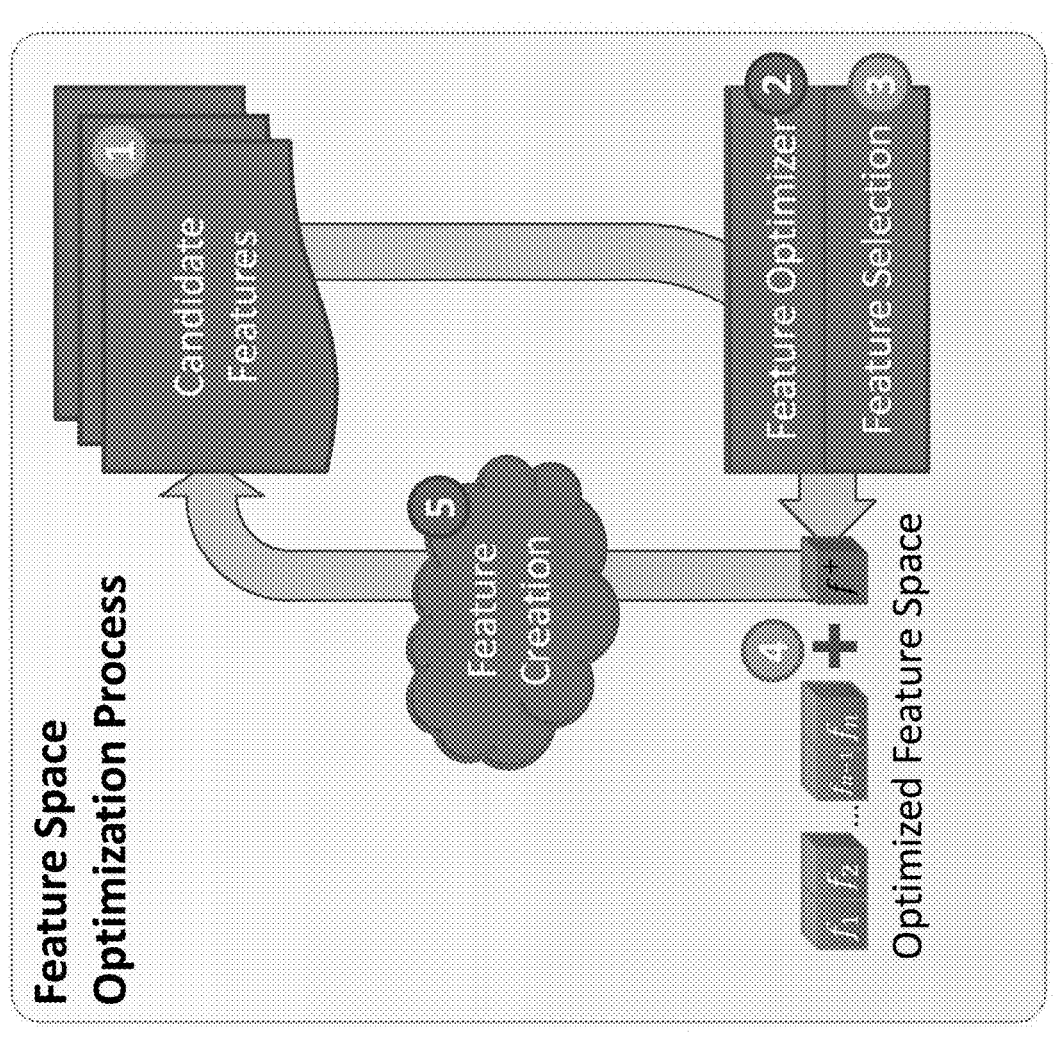

FIG. 9 illustrates an exemplary feature space optimization process in accordance with one or more disclosed aspects.

Figure 10:
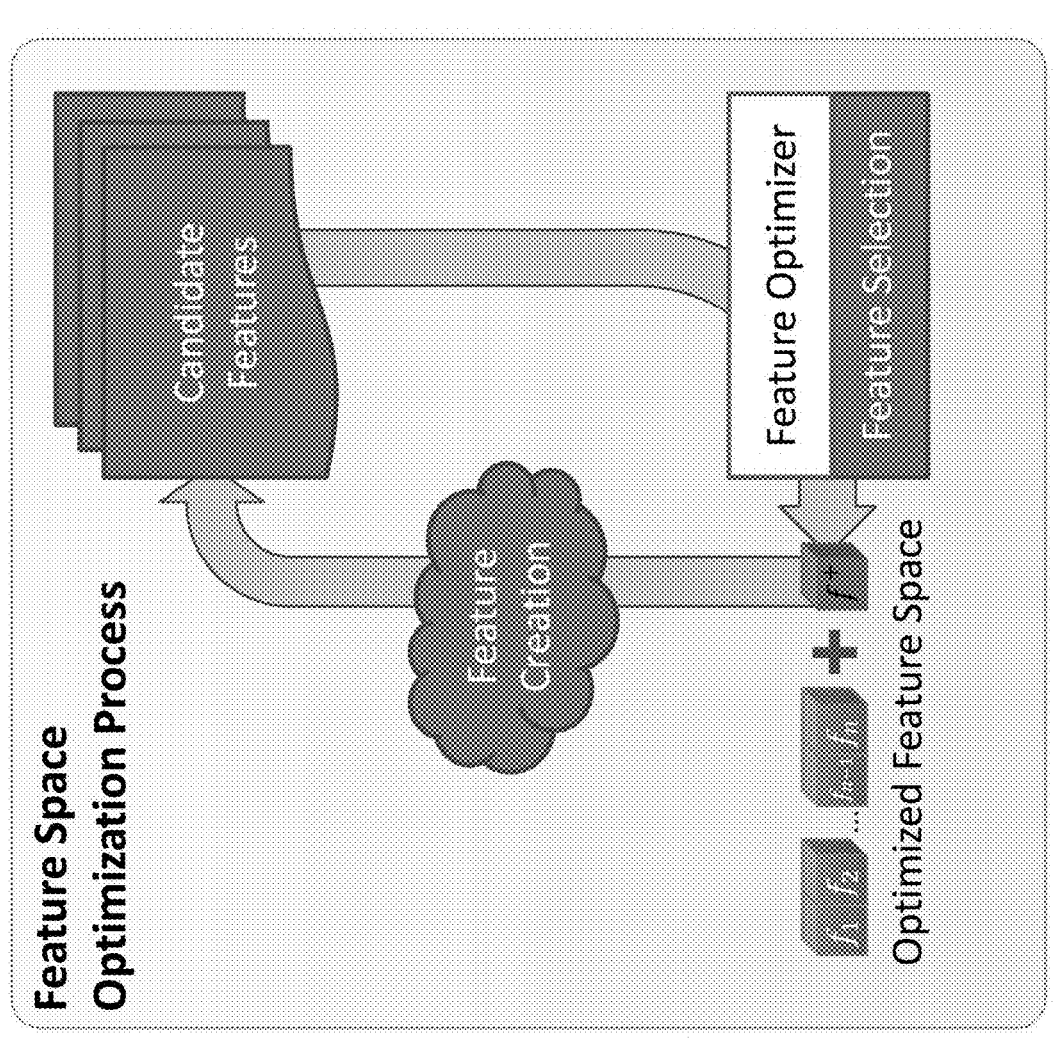

FIG. 10 illustrates an exemplary feature space optimization process in accordance with one or more disclosed aspects.

Figure 11:
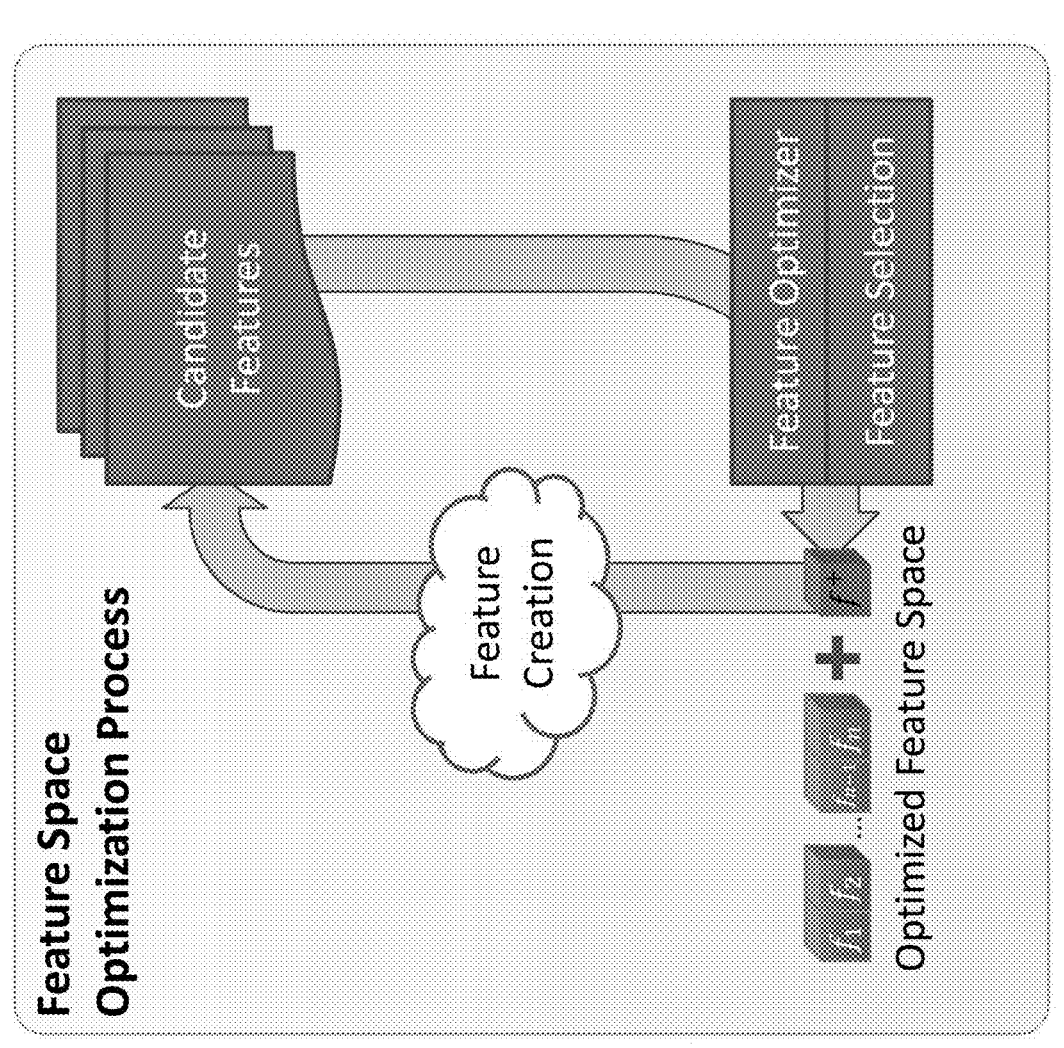

FIG. 11 illustrates an exemplary feature space optimization process in accordance with one or more disclosed aspects.

FIG. 12 illustrates an example optimization method in accordance with one or more disclosed aspects.

Figure 13:
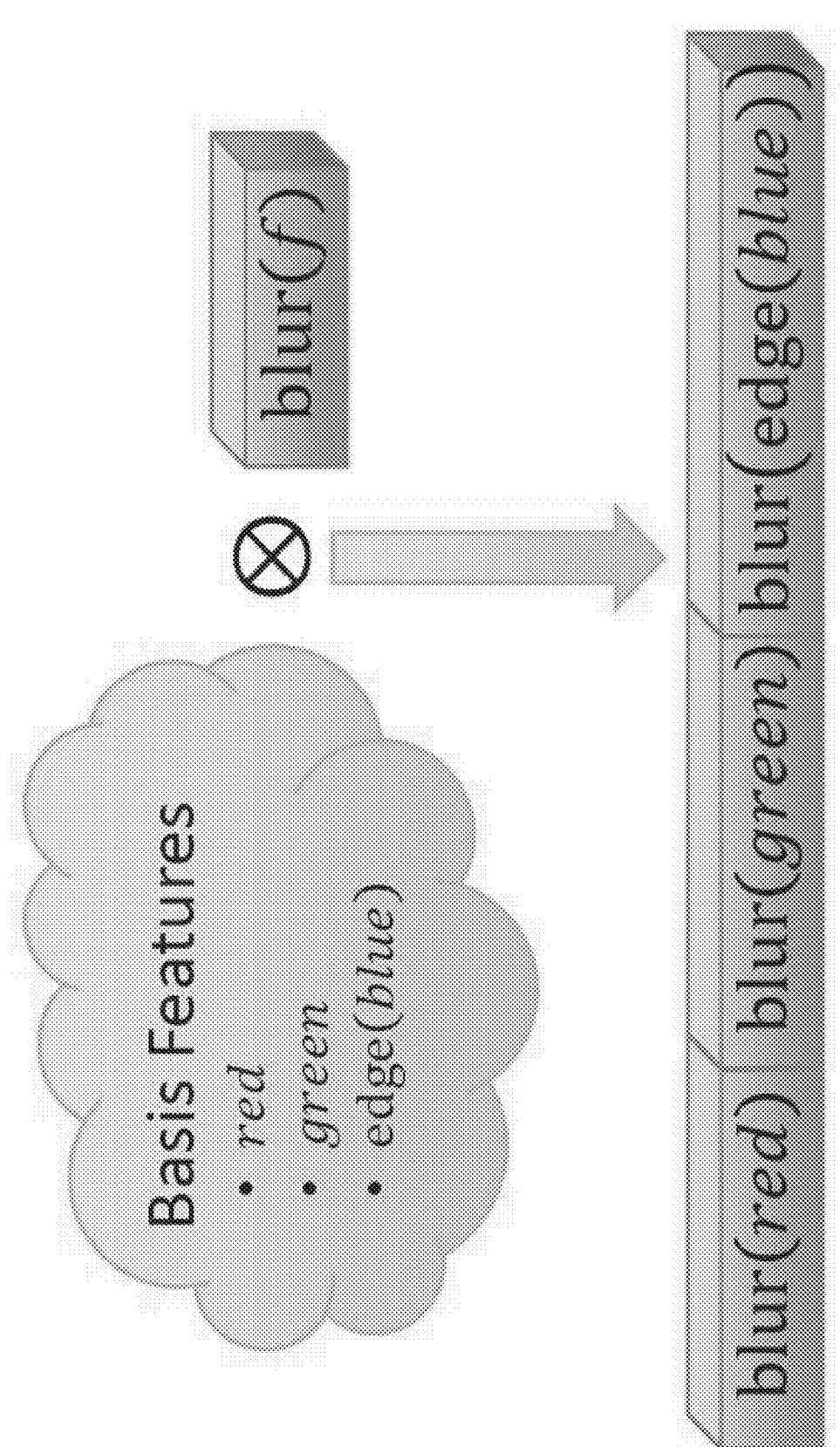

FIG. 13 illustrates an example feature space for a classifier in accordance with one or more disclosed aspects.

Figure 14:
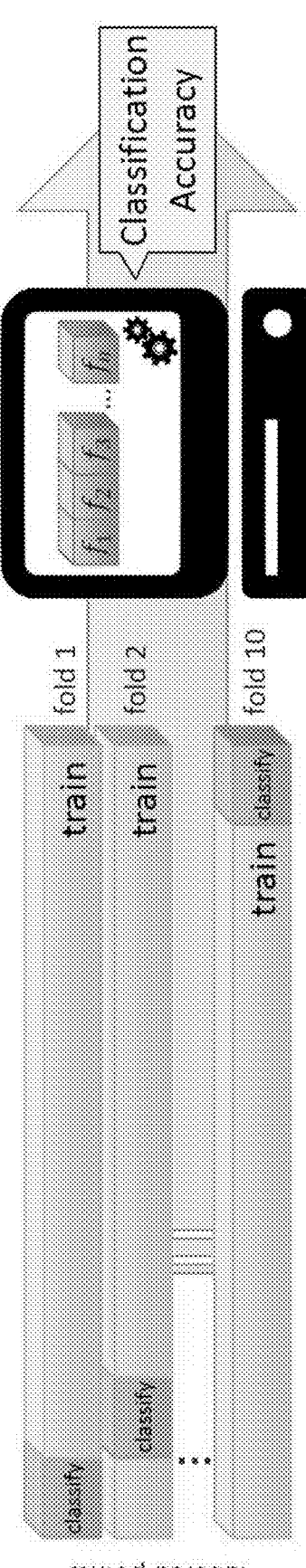

FIG. 14 illustrates an example 10-fold cross-validation in accordance with one or more disclosed aspects.

Figure 15:
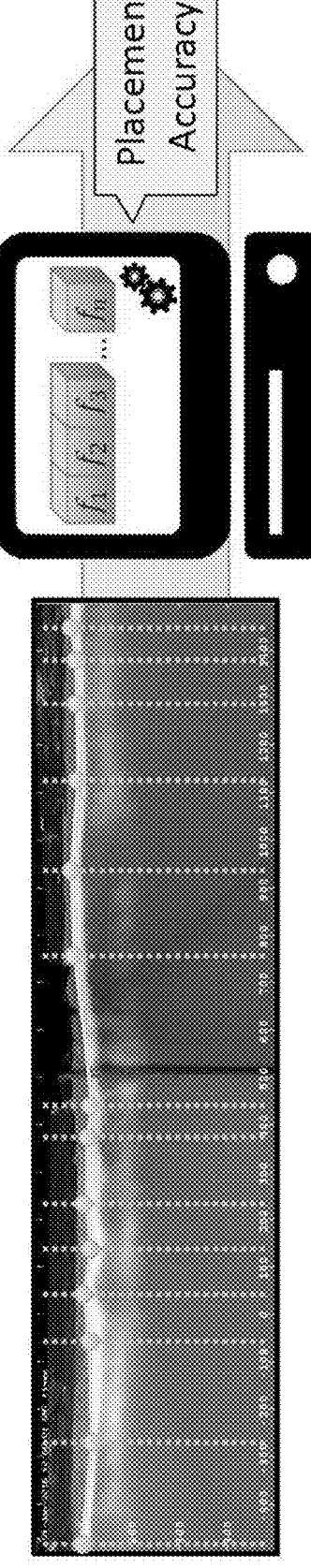

FIG. 15 illustrates an example illustration of a method for performing an automated vertex placement/online learning cycle human-in-the-loop annotation process in accordance with one or more disclosed aspects.

Figure 16:
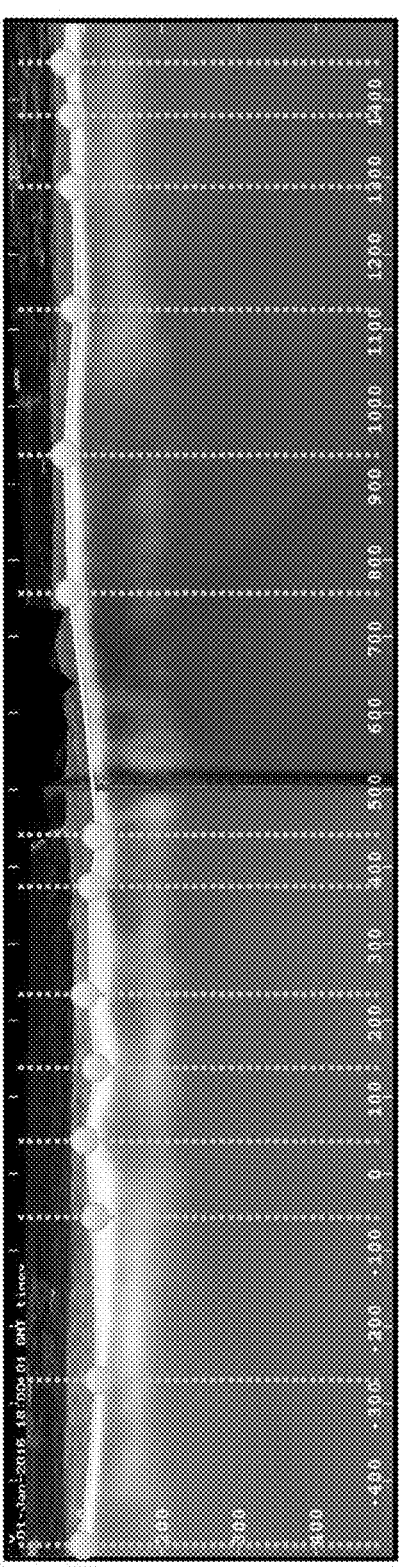

FIG. 16 illustrates an example illustration of a method for performing an automated vertex placement/online learning cycle human-in-the-loop annotation process in accordance with one or more disclosed aspects.

Figure 17:
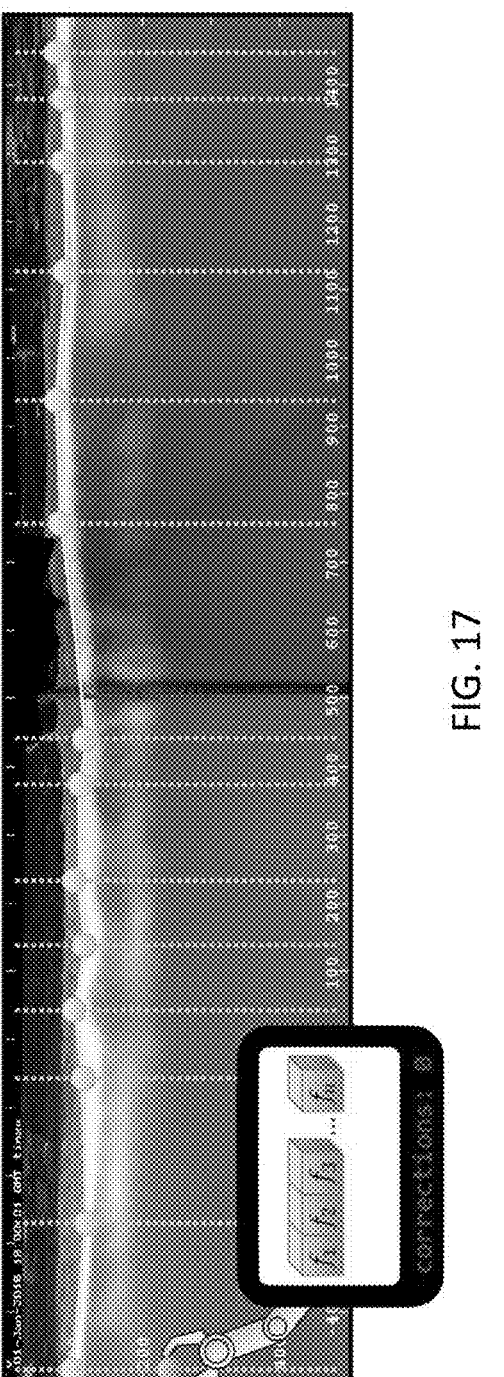

FIG. 17 illustrates an example illustration of a method for performing an automated vertex placement/online learning cycle human-in-the-loop annotation process in accordance with one or more disclosed aspects.

Figure 18:
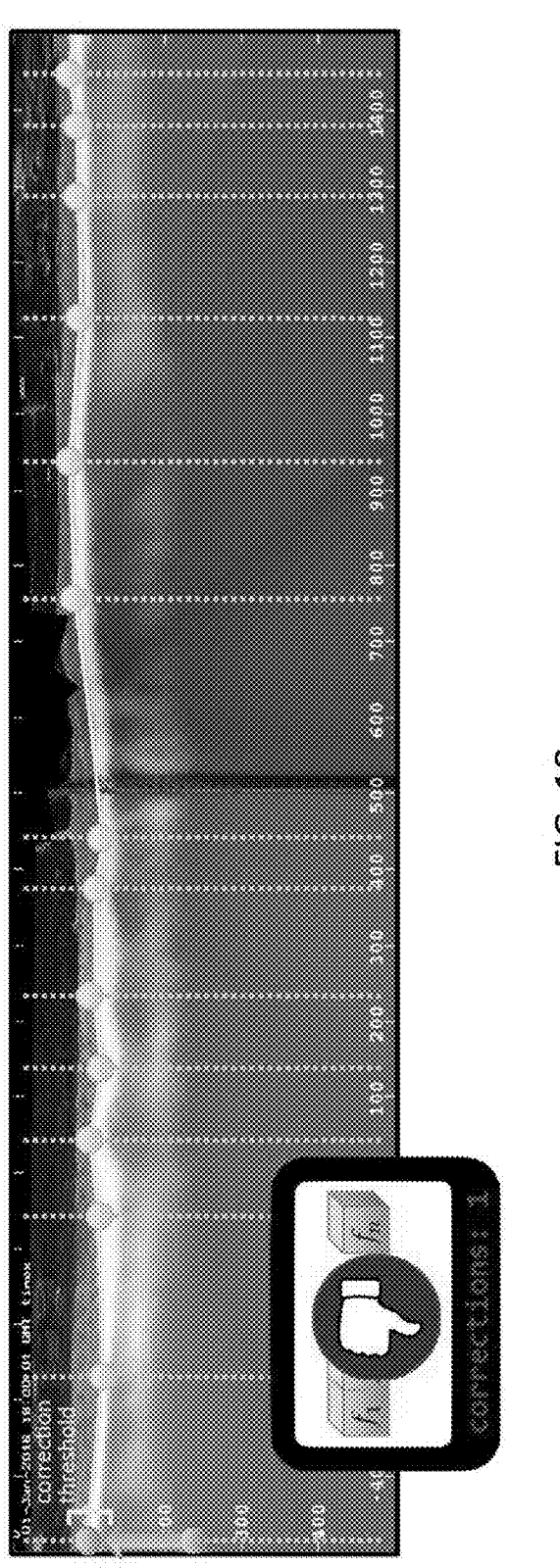

FIG. 18 illustrates an example illustration of a method for performing an automated vertex placement/online learning cycle human-in-the-loop annotation process in accordance with one or more disclosed aspects.

Figures 19, 20:
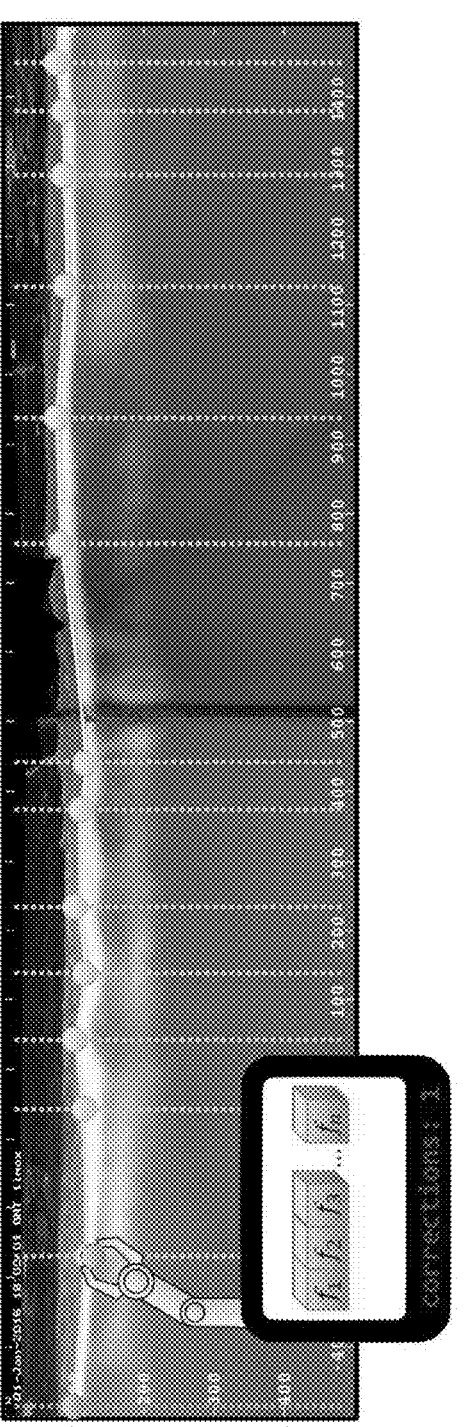

FIG. 19 illustrates an example illustration of a method for performing an automated vertex placement/online learning cycle human-in-the-loop annotation process in accordance with one or more disclosed aspects.

FIG. 20 illustrates an example illustration of a method for performing an automated vertex placement/online learning cycle human-in-the-loop annotation process in accordance with one or more disclosed aspects.

Figure 21:
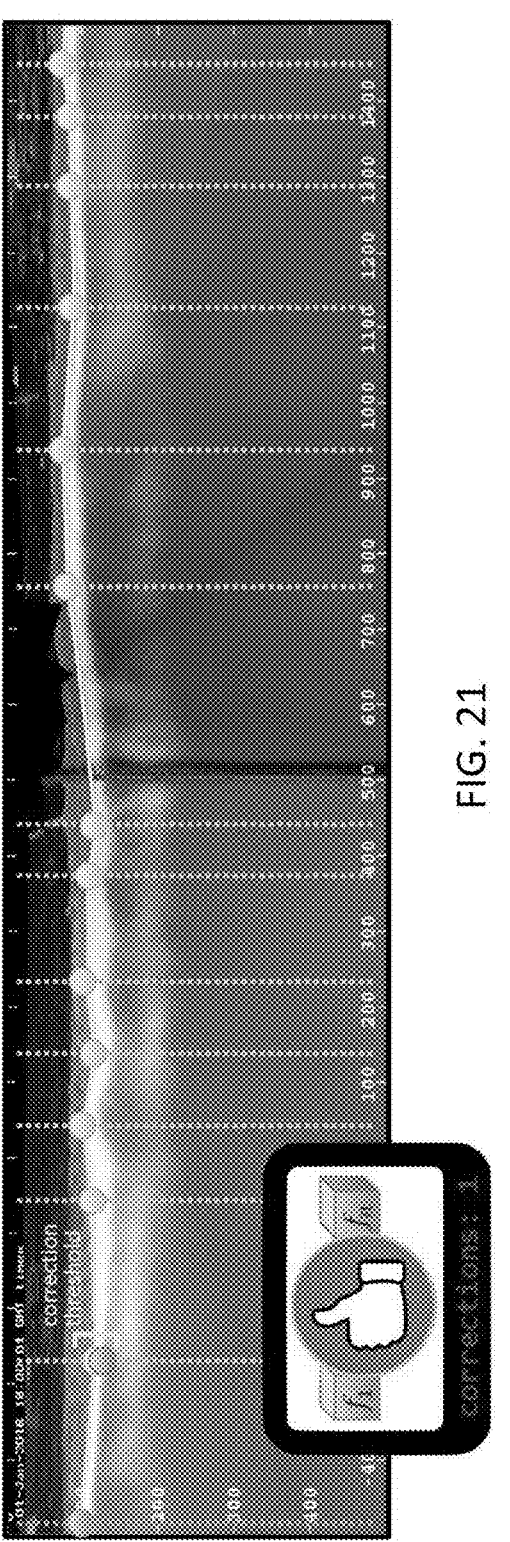

FIG. 21 illustrates an example illustration of a method for performing an automated vertex placement/online learning cycle human-in-the-loop annotation process in accordance with one or more disclosed aspects.

Figure 22:
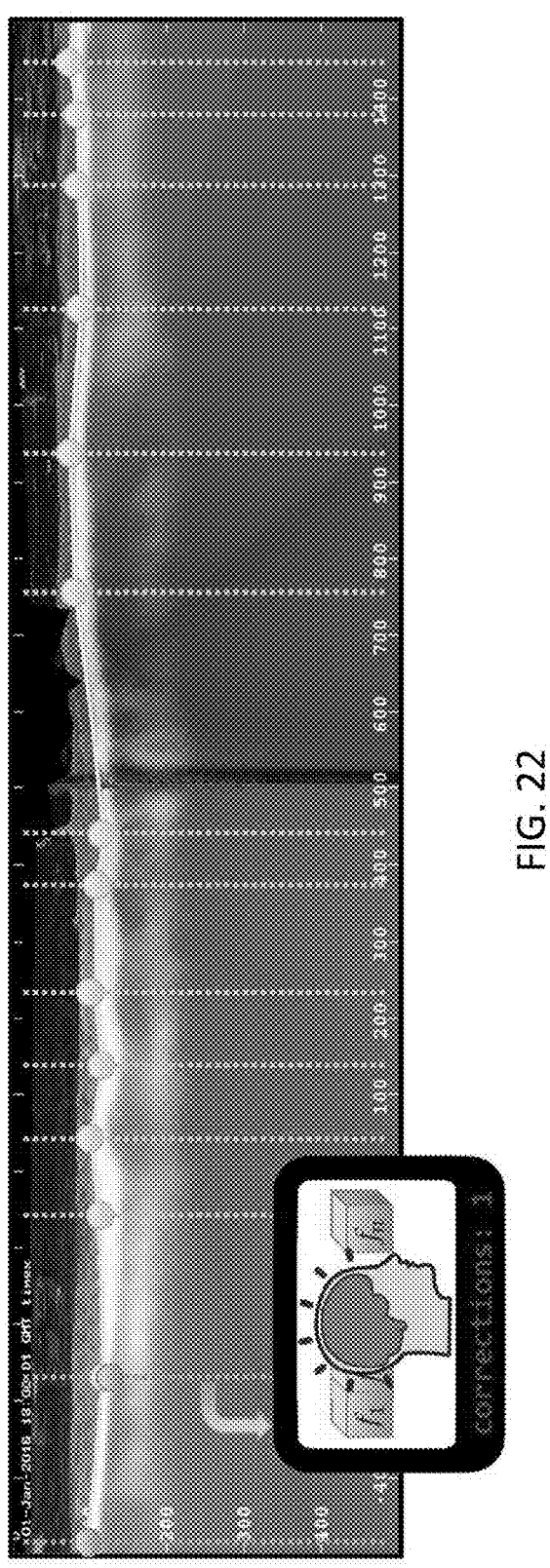

FIG. 22 illustrates an example illustration of a method for performing an automated vertex placement/online learning cycle human-in-the-loop annotation process in accordance with one or more disclosed aspects.

Figures 23, 24:
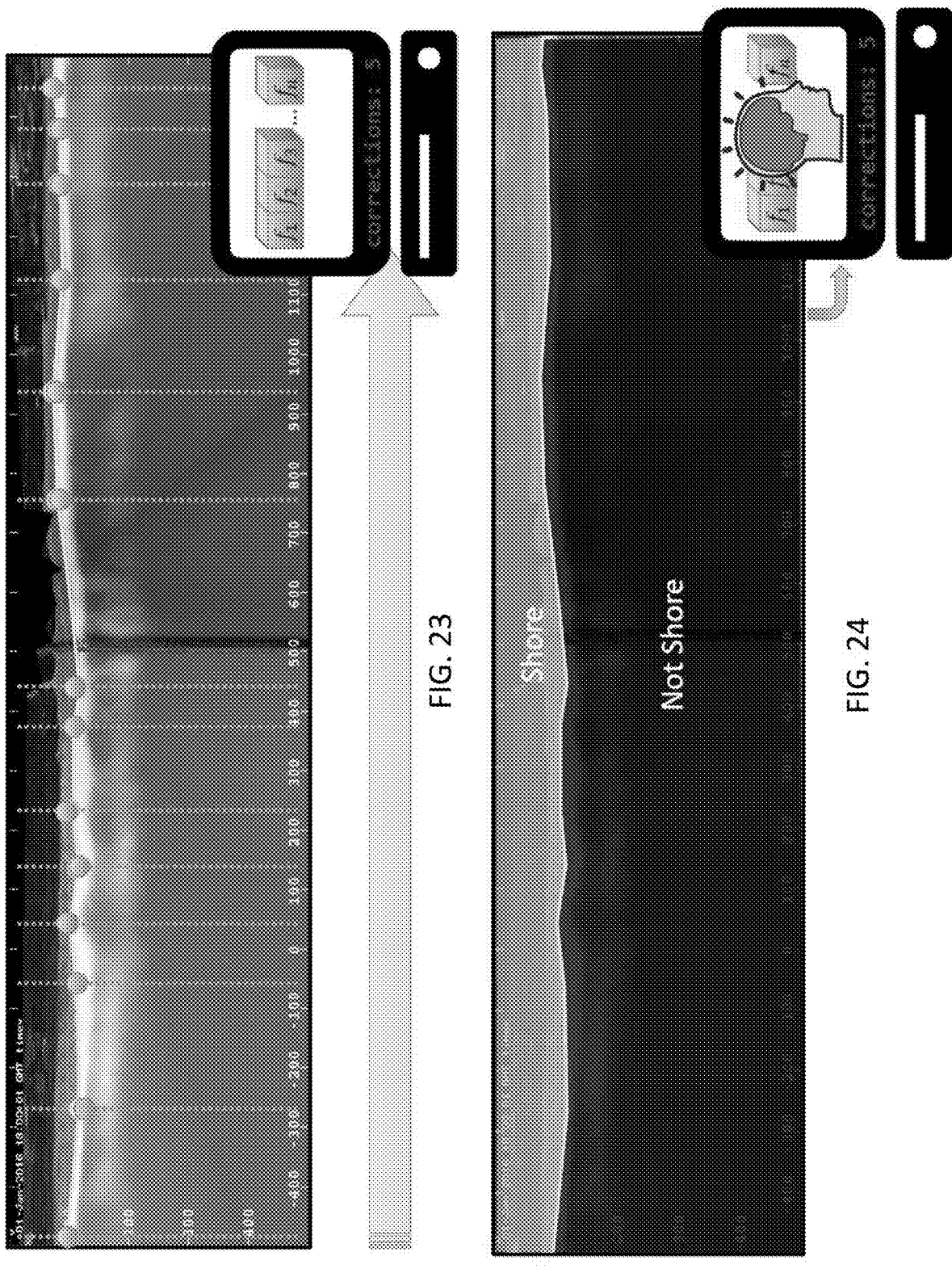

FIG. 23 illustrates an example illustration of a method for performing an automated vertex placement/online learning cycle human-in-the-loop annotation process in accordance with one or more disclosed aspects.

FIG. 24 illustrates an example illustration of a method for performing an automated vertex placement/online learning cycle human-in-the-loop annotation process in accordance with one or more disclosed aspects.

FIG. 25 illustrates an example illustration of a method for performing an automated vertex placement/online learning cycle human-in-the-loop annotation process in accordance with one or more disclosed aspects.

Figure 26:
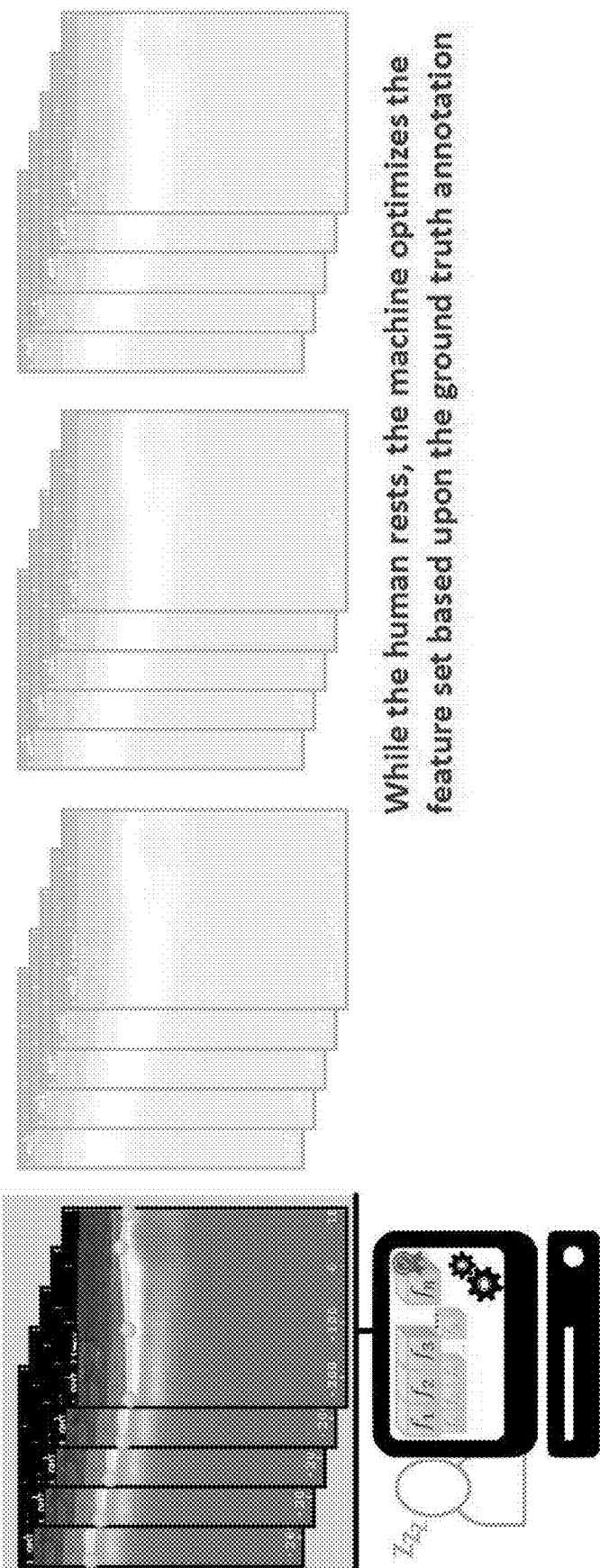

FIG. 26 illustrates an example illustration of a method for performing an automated vertex placement/online learning cycle human-in-the-loop annotation process in accordance with one or more disclosed aspects.

Figure 27:
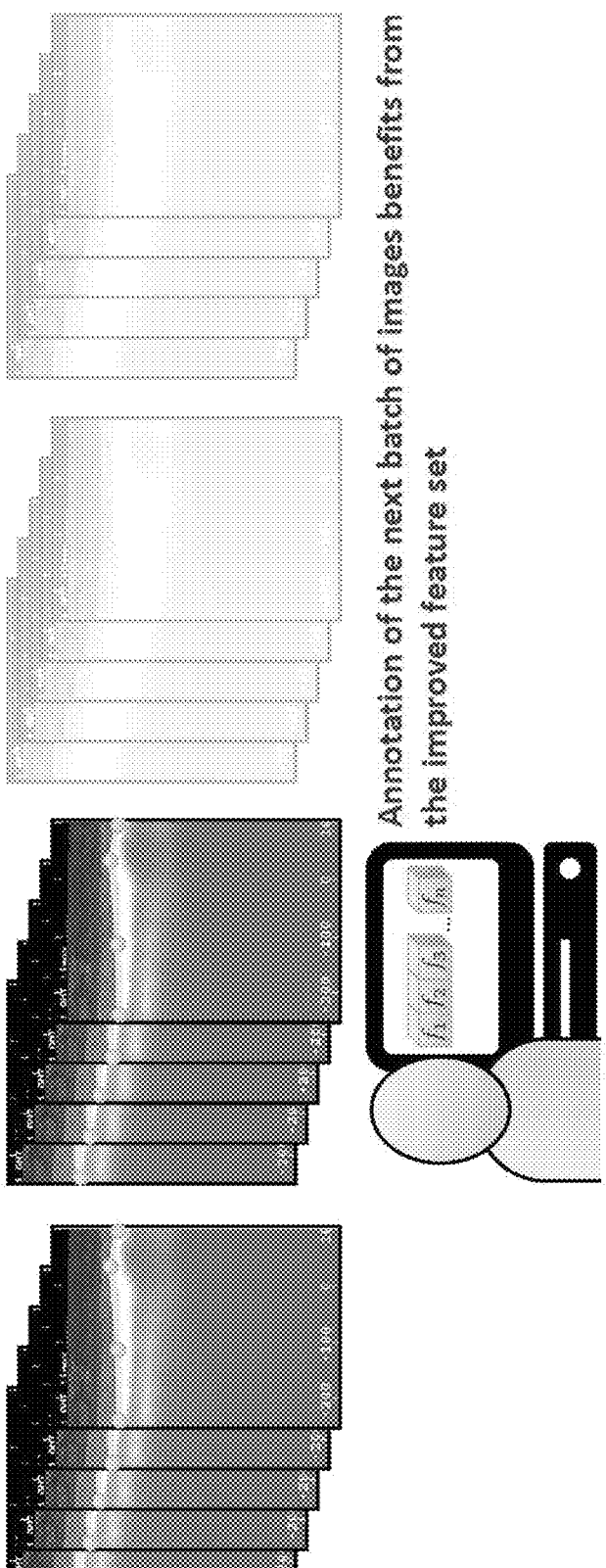

FIG. 27 illustrates an example illustration of a method for performing an automated vertex placement/online learning cycle human-in-the-loop annotation process in accordance with one or more disclosed aspects.

Figure 28:
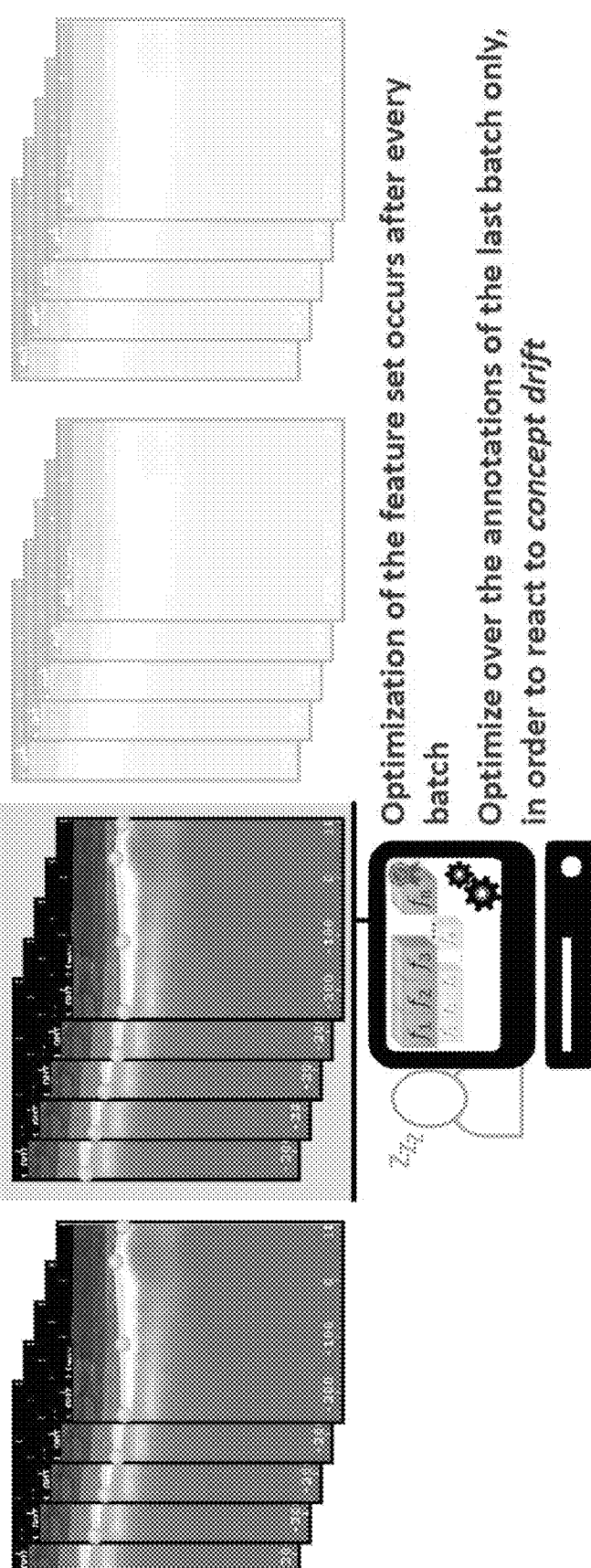

FIG. 28 illustrates an example illustration of a method for performing an automated vertex placement/online learning cycle human-in-the-loop annotation process in accordance with one or more disclosed aspects.

FIG. 29 illustrates an example method in accordance with one or more disclosed aspects.

Figure 30:
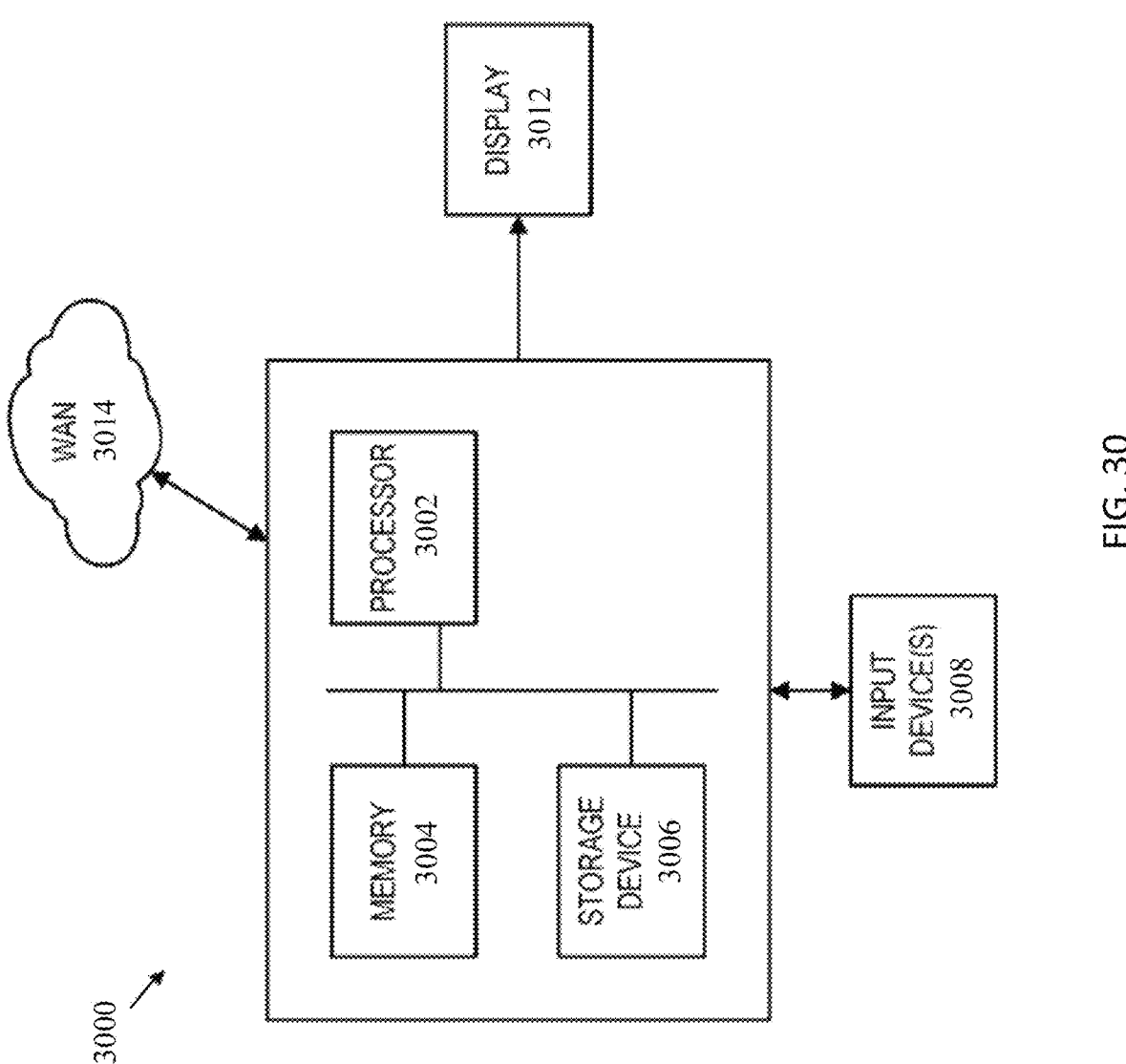

FIG. 30 illustrates an example computer system, in accordance with one or more disclosed aspects.

DETAILED DESCRIPTION

The aspects and features of the present aspects summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

Disclosed aspects describe one or more embodiments that provide an optimized feature space for improved performance of a human-machine team (HMT) for geographic region digitization. The optimization method described allows for periodic examination of the underlying features that drive the machine learning implementation of the machine teammate (e.g., a computer system, processing device, processor, and/or the like, such as shown in FIG. 30. This technique produces an optimally constructed feature space that reacts to perceived changes in the context of the geographic region being digitized.

The state of the art in collaborative human-machine geographic region digitization yields 80% automation in vertex placement when digitizing land-water boundaries in small remotely sensed persistent image sets. However, these techniques have difficulty scaling to large datasets due to the complexity of instance-based learning and concept drift, or sudden shifts in environmental context.

While general optimization of instance-based feature spaces has been covered in the state-of-the-art, few focus on being tightly coupled with the HMT. Highly parameterized features are typically represented by a bank of features that cover a range of parameterizations. This can lead to a very large feature dimensionality with many features that may provide little correlation, which is well-known to cripple the computational performance of instance-based learners. Approaches that attempt to learn optimal parametrizations through deep convolutional neural networks incur great computational costs that are at odds with the requirements of an online learning implementation to quickly train and classify. Other techniques that utilize mathematical transforms of the feature data require a rich feature space which is not trivial when using instance-based learners for online learning.

Disclosed embodiments use the HMT, scales the machine teammate to larger datasets, and provides robustness to handle concept drift. The optimization implementation yields machine models that are used after a predefined period to build more a more refined classifier.

It does so through a combination of a greedy sequential feature selection algorithm. At each iteration of the algorithm, all eligible features in the candidate feature pool will be extracted for every candidate pixel. Each extracted feature is added to the machine model of selected features and evaluated using the objective function. Then, the feature that yielded the highest gain in the objective is selected, and the algorithm repeats until no single feature in the pool yields gain. The unique objective function assesses the accuracy of machine vertex placements against the ground truth.

For features that have input parameters, a black-box global optimization algorithm (e.g. Nelder-Mead) is used to find an optimal parameter set to maximize the objective for a model containing the feature in question.

Some features are high-order because they use a base image raster in order to conduct feature extraction, e.g., convolutional filters. After an individual round of feature selection, the optimizer is allowed to explore the use of new high-order features, dynamically based on the newly selected feature.

Figure 1:
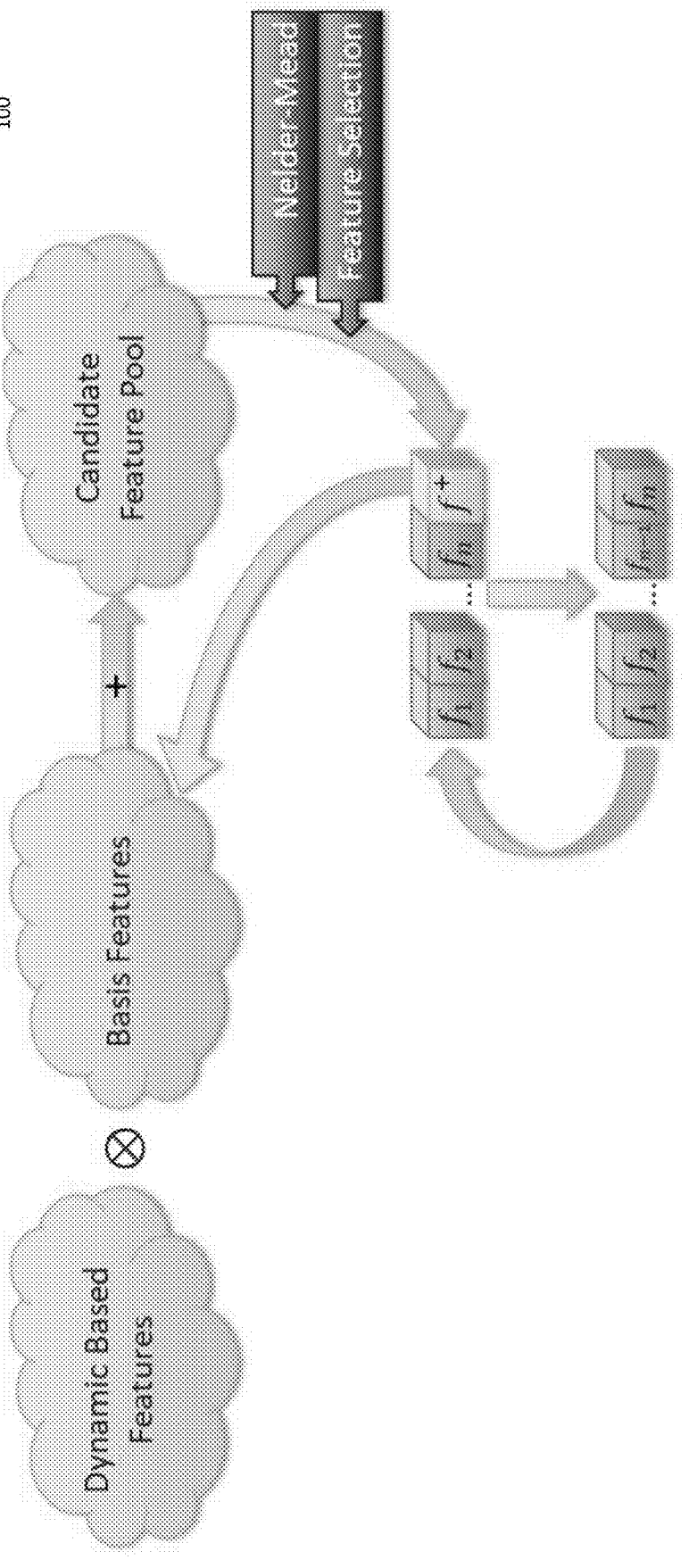
FIG. 1 illustrates an example method in accordance with one or more disclosed aspects.
Figure 2:
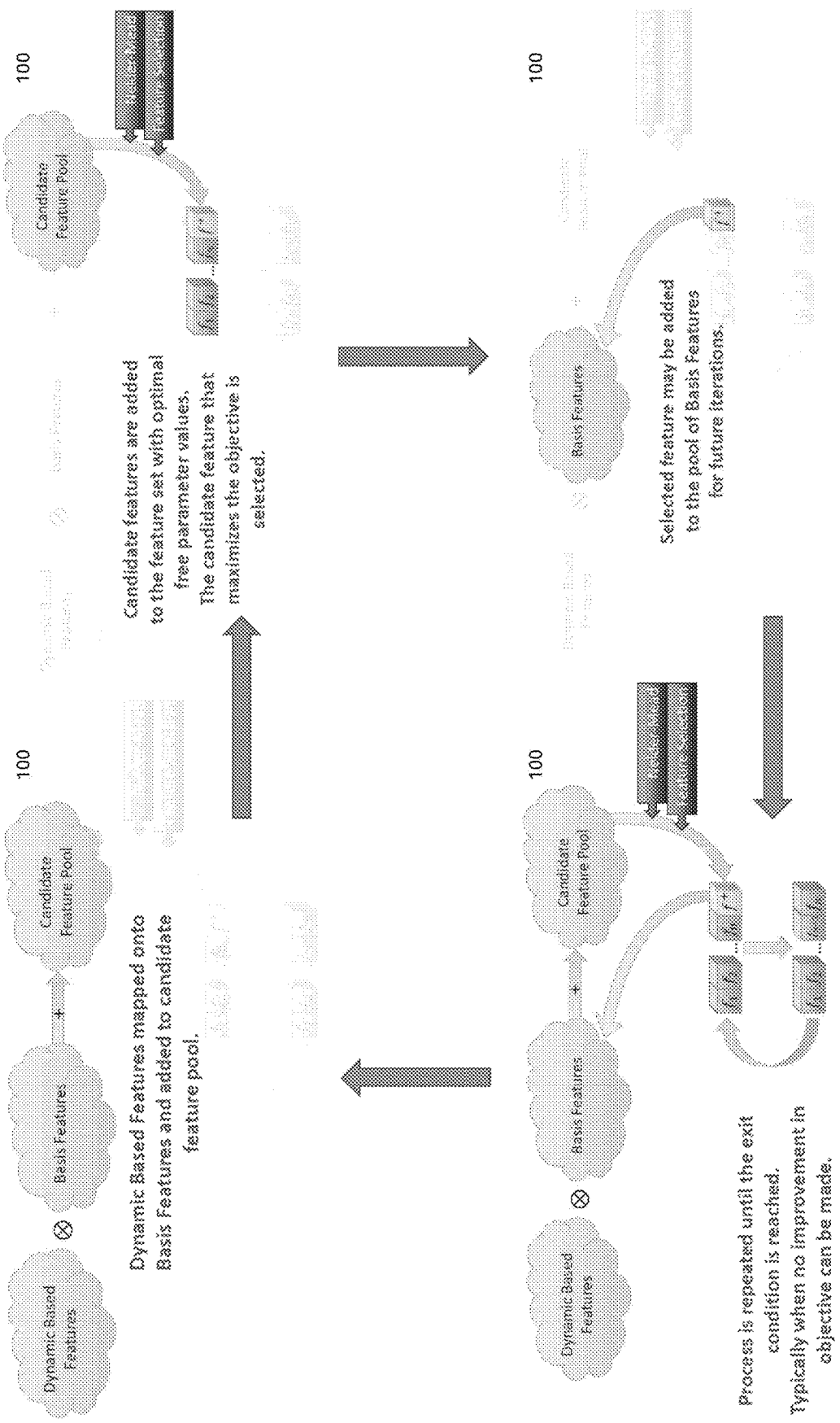
FIG. 2 illustrates an example method in accordance with one or more disclosed aspects.

FIGS. 1 and 2 illustrate an exemplary optimization process 100 in accordance with disclosed aspects. A pool of candidate features is composed of standalone features along with dynamic features that are combinations of high-order features with valid basis features. Every iteration, features from the candidate pool are individually evaluated with the currently accepted feature set to find the addition that maximizes the objective function through a greedy sequential feature selection algorithm. Optimal parameterization of each candidate feature is performed using the Nelder-Mead method when applicable. The chosen feature becomes part of the accepted feature set for the next iteration and also becomes available as a basis for new high-order features if applicable.

According to some aspects, the optimization process 100 can be run after a batch of images were annotated by an HMT. The method uses these, now ground truth, annotations, and use the described techniques to produce a new feature set with which to continue further image annotation. The new feature set enables the machine teammate to perform optimally, tailoring the underlying feature space for improved performance and adapted to any perceived context shift in the image data.

Unlike other optimization techniques that only consider the final digitization, this method takes into account the iterative composition of each contour during the iterative HMT workflow.

This method offers the freedom to fundamentally change the make-up of the feature space through feature selection, and it explicitly generates new features through parameter optimization of complex higher-order features.

By integrating into the natural HMT workflow, performing periodic optimizations of the feature space, this method can more readily react to perceived context shifts in the data, such as those induced by short term weather events.

Disclosed embodiments describe the weak scaling of the geographic region digitization HMT on a 50-image dataset of a littoral region. Disclosed embodiments target the highly dynamic nearshore region, which is the region of breaking waves and swash of a beach, because of the properties of its delineation: The shoreline exhibits crisper features with little concept drift while the offshore surf zone boundary exhibits fuzzier features with both short-term and long-term concept drift. It is shown that both computational performance and precision are lacking for this larger dataset. Therefore, several novel optimization techniques built specifically for the HMT are introduced. The best performing optimization technique, which is referred to as compositional interface schemata (CIS), optimizes using an objective function based on the finer-grained performance of the HMT rather than solely using the classification accuracy of the instance-based online learning implementation. An example of CIS compared to a more conventional optimization technique is shown in FIG. 3.

Disclosed embodiments use the term digitization, which emphasizes the manual process of digitizing features of interest from imagery. The term segmentation, which is also appropriate, mainly emphasizes processes for automatically performing digitization. Computer science literature typically uses the term "segmentation" while physical science literature typically uses the term "digitization".

2 Situational Description

Figure 4:
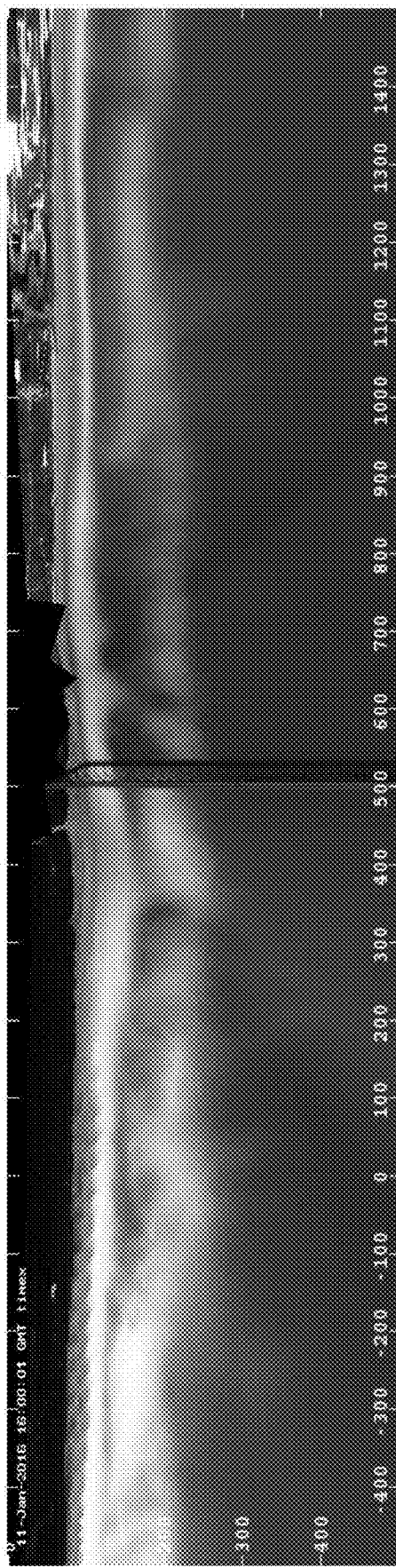
FIG. 4 illustrates an example fixed multi-camera setup that is orthorectified in order to generate an image that mimics an overhead view where the coastline runs horizontally in accordance with one or more disclosed aspects.

The nearshore region of a beach is the contiguous dynamic area composed of the surf zone, or region of breaking waves, and the swash zone, or the region where waves run up the beach at the shoreline [7]. The nearshore region is of high interest for study due to its correlation to tide, particle transport, dangerous conditions, littoral bathymetry, and animal life. The automatic detection of the nearshore region from coastal imagery is a difficult problem, mainly due to environmental context sensitivity, subjectivity in delineation, and variability [17]. In the vast majority of cases, nearshore regions are studied using persistent imaging data sets derived from platforms such as the Argus system, where 10-minute time-averaged composite images are collected at every hour [8]. The fixed multi-camera setup is orthorectified in order to generate an image that mimics an overhead view where the coastline runs horizontally, as shown in FIG. 4.

This orthogonal view enables the specification of a constrained HCl for digitizing both the shoreline and the offshore boundary of the surf zone, which delineate the nearshore region. For brevity, disclosed embodiments refer to these features as shore and surf respectively. Shore and surf may each be contoured by a piecewise linear polyline that extends horizontally towards image boundaries. The novel HCl used for HMT digitization of shore and surf is modeled after the extending functional polyline or EFPL [14]. The EFPL constrains the way a contour used for digitization is refined in order to exploit the general nature of how nearshore region boundaries appear in orthorectified imagery. Upon instantiation, the EFPL contains a single machine-placed vertex and a linear contour intersecting this vertex which extends along some predefined orientation. The vertex may then be corrected by the human through a click-and-drag interface, such as within a confined linear search space perpendicular to the contour's initial orientation. Subsequent vertices may be inserted by the machine or human at any point along the contour with each vertex's search space parallel to all other search spaces. Once a machine vertex placement is either confirmed or corrected by the human, the pixels intersecting the placed vertex's search space are labeled in the following way: pixels above the vertex are labeled as positive for the class (shore or surf) and pixels below the vertex are labeled negative for the class. Feature extraction is performed on these pixels in order to create instances to train the online learning implementation used for vertex placement. A visual example of the HCl is shown in FIG. 5.

A K-Nearest Neighbors (KNN) classifier that has been modified to incorporate uncertainty is used as the machine classifier as in [14]. The classifier is similar to the Fuzzy KNN presented by Keller et al. which assigns fuzzy memberships based on the distances of neighboring instances

[10]. Classification is exclusively performed on pixels and uses a volumetric uncertainty weighting scheme. The uncertainty is defined as $$U_a(\vec{p_j}) = 1 - \frac{\left| \sum_{k=1}^{K} \frac{2L_a(\vec{p_k}) - 1}{(1 + \Delta(\vec{p_j}, \vec{p_k}))^n} \right|}{K} \quad (1)$$

where $U_a(\vec{p_j}) \in [0, 1]$ maps a feature vector $\vec{p_j}$ to a likelihood of incorrect classification for the feature class a, $L_a(\vec{p_k}) \in \{0, 1\}$ is the label of the nearest neighbor for the given class, $\Delta(\vec{p_j}, \vec{p_k})$ is the Euclidean distance between the two feature vectors, and n is the number of dimensions in a feature vector. The binary classification $C_a(\vec{p_j}) \in \{-1, 1\}$ maps to $-1$ if $U_a(\vec{p_j}) < 0.5$ or maps to 1 otherwise.

Vertex placement is performed by the machine teammate after classifying all pixels of the search space for some insertion point along the contour. An algorithm used to place the vertex scans the search space in order to find a transition from positively labeled pixels to negatively labeled pixels given some threshold. This is known as near-continuous placement as described in [14].

Optimization of instance-based feature spaces has been heavily covered in the state of the art. Disclosed embodiments focus on methods relevant to instance-based online learning that can be used within a tightly coupled HMT. The Gabor filter, which is a parameterized texture filter [4], represents a good candidate for feature-space optimization due to its complex parameter space. Typically, a bank of Gabor filters is used to cover a range of sizes and orientations to detect classes of interest [13]. However, such an approach may lead to a very large feature dimensionality with many features providing little correlation, which is well-known to cripple the computational performance of instance-based learners. One approach would be to limit the Gabor filter parameterizations to those that exhibit significant correlation to the classification. The concept of learnable Gabor parameters has been implemented in GaborNET [2] as a layer in a deep convolutional neural network with parameter updates driven by standard backpropagation techniques. Because an HMT may have the online learning implementation quickly train and classify, the computational cost of deep backpropagation is generally infeasible. Another approach to feature optimization is to learn a set of mathematical transforms of the input feature data that improve predictive accuracy [15]. However, this approach can have a rich feature space which is not trivial when using instance-based learners for online learning. As shown in FIG. 12, disclosed embodiments provide for an optimization that differs from such approaches in combining the following two methods. First, it offers the freedom to fundamentally change the make-up of the feature space through feature selection. Finally, it explicitly generates new features through parameter optimization of complex higher-order features. For example, such as described herein, disclosed embodiments provide for a sequential feature selection that may include starting with an empty set feature, adding the feature from the candidate pool that maximizes the object function C, and repeating the addition of features until the exit criteria is met. Disclosed embodiments provide for the use of one or more Gabor Filters:

Gabor Filter: gabor x, y; $\lambda$, $\theta$, $\psi$, $\sigma$, $\gamma$; where $\lambda$ is wavelength, $\theta$ is orientation, $\psi$ is phase offset, $\sigma$ is standard deviation, and $\gamma$ is aspect ratio.

In some embodiments, some parameters (e.g., $\psi$, $\sigma$, $\gamma$) may be assigned as fixed values/parameters, where other parameters (e.g., $\lambda$, $\theta$) may be free parameters to be optimized. Disclosed embodiments provide for finding values for free parameters of the feature set that maximize the objective:

$$gabor' = \underset{\lambda,\theta}{\mathrm{argmax}} C(F_{n|} + gabor(x, y; \lambda, \theta))$$

General optimization of an HMT remains an unexplored topic. The most relevant studies known to the authors explore active learning approaches, where the machine must choose which unlabeled samples to present to the human teammate for annotation in order to gain the most information and obtain a high classification performance [3]. Other work focuses on recognizing problem instances that would be difficult for the machine, and consequently, consulting the human teammate would provide the most benefit [19]. Disclosed embodiments provide a first approach to optimization for the scaling a human-machine team for region digitization.

Method for Human-Machine Team Optimization

Though the online classifier used for the HMT is ideal for interactive machine learning in that it can quickly train and classify for each vertex placement, it can provide for computational performance loss for high instance counts due to O(log N) complexity. This dramatically causes slowdown at the "memory wall" threshold. Additionally, the conventional way in which the classifier is used may cause a sharp drop in accuracy under concept drift due to bias in larger datasets. Therefore, disclosed embodiments describe the following optimization method that considers the HMT, scales the machine teammate to larger datasets, and provides robustness to concept drift.

The workflow for evaluating optimizer performance is defined in order to mimic an HMT for creating a dataset with a digitized nearshore region in time order for the Duck, North Caroline, U.S.A. Argus site. The dataset consists of 50 orthorectified 10-minute-time-exposed images taken from 1-20 Jan. 2016. This time period was chosen due to the varying weather events that caused an especially dynamic nearshore region with dozens of images containing active surf zones and rip currents. Digitization of the images is performed starting at the first image then continuing in chronological order. The online classifier of the HMT will begin with a cold start, which means it might not be trained on prior instances. The initial feature space for the classifier is set to contain red intensity, green intensity, blue intensity, brightness, row coordinate, and column coordinate for each pixel, such as illustrated in FIG. 13.

We present optimization implementations that examine 5-, 10-, and 25-image periods, where each implementation considers the images that occur within the respective period during the optimization procedure. Disclosed embodiments provide for a machine model that may be a classifier with a unique feature space. Optimization implementations yield machine models that are used after their respective periods to build more refined classifiers. At the beginning of an optimizer's period, the prior machine model will be discarded and the new model begins from a cold start. For example, given a 5-image period optimizer, the machine model derived at image 5 will no longer be considered after the 10th image. Intuitively, optimizer implementations with longer image periods should tend to correlate to longer-term features while those with smaller periods should correlate to shorter-term weather events.

The following text presents the details of algorithms used to specify and evaluate machine models.

3.1 Objective Functions

A more naive optimization technique would take into account the final digitization of the nearshore region, disregarding the iterative composition of each contour during the iterative labeling process. Here, disclosed embodiments explore the incorporation of finer-grained tasks involved with the HCl for optimization. Disclosed embodiments refer to this technique as compositional interface schemata (CIS) optimization. CIS are partly inspired by the linguistic property of compositionality, which addresses the human brain's unique ability to create meaning of a signal by decomposition of its parts and the way in which the parts are put together [11]. CIS optimization may be implemented by using an objective function that disregards overall classification accuracy for labeled images and instead examines the performance of each vertex placement within the ground truth.

The CIS objective function assesses the accuracy of machine vertex placements against the ground truth. Since pixel-perfect vertex placement might not be required for all annotation tasks, disclosed embodiments define a correction threshold with respect to each class (shore and surf) to determine the distance a vertex needs to be placed away from ground truth before a correction is considered necessary. The thresholds were calculated prior to experimentation by averaging the variance in ground-truth vertex placement collected by several analysts. If the machine's vertex placement is within the correction threshold, it will be considered correct and might not be adjusted; otherwise, the vertex will be moved to the ground truth location and counted as a correction. The CIS objective function also keeps track of the total distance that all machine-placed vertices deviate from ground truth. This total correction distance is normalized by the maximum possible total correction distance across all placements to produce a fractional component that adds to the raw number of corrections needed. Doing so rewards machine models that produce smaller overall correction distances.

The conventional objective function performs 10-fold cross-validation [6] on an evaluation set of previously labeled data, and the percentage of correct classifications represents the accuracy metric. For the sake of a fair comparison to the CIS objective, the evaluation set is restricted to the exact same labeled data points that are used by the machine to perform its vertex placements. This method ensures that both optimization methods have equivalent feature information, both in quantity and content, with which to maximize their respective objective. With this method of choosing the evaluation set for 10-fold cross-validation, such as shown in FIG. 14, disclosed embodiments can eliminate any performance differences that would be due to one objective having the benefit of access to more or different image feature data. In some cases, disclosed embodiments may use a 5- or 25-fold cross-validation, or other type of cross-validation. Machine classifications can be evaluated against ground truth labeling.

FIGS. 15-28 illustrate example aspects of performing an automated vertex placement/online learning cycle human-in-the-loop annotation process, where machine placement correctness can be evaluated against ground truth placements. According to some aspects, disclosed embodiments may start with a ground truth annotation (shown as the vertical dotted lines in FIGS. 15 and 16). Moving from left to right, the machine may place a vertex within the signal (constraint space) of the ground truth placement (FIG. 17). In the case of a machine placement being outside of the correction threshold, the placement may be counted as an incorrect placement, and the vertex is corrected to the ground truth location (FIG. 18). With the placement corrected, the classifier is trained with the labeled points within the corrected vertex's signal (FIG. 19). With the knowledge gained from the previous placement, the machine places the next vertex (FIG. 20). In the case of having a vertex placed within the correction threshold with respect to ground truth (FIG. 21), then no correction may be needed, and the classifier may be trained with the labeled pixels within the vertex's signal (FIG. 22). The process repeats for each ground truth vertex, from left to right, until all placements have been made and evaluated (FIG. 23). Before moving on to the next image, the classifier rolls back training from individual vertices and trains on a sampling of the entire labeled image (FIG. 24), such as identifying the portion of the image that corresponds to the shore and not the shore (e.g., water). The human/machine team may annotate the first patch of images (FIG. 25). The machine may optimize the feature set based on the ground truth annotation (FIG. 26). Annotation of the next batch of images can benefit from the improved feature set (FIG. 27). In some cases, optimization of the feature set may occur after each batch (FIG. 28). In some cases, optimization may use the annotation of the last batch/most recent batch in order to react to concept drift (FIG. 28).

3.2 Greedy Sequential Feature Selection

A modified sequential feature selection algorithm [1] is used as a kernel for optimization. At each iteration of the algorithm, all eligible features in the feature pool will be extracted for every candidate pixel. Each extracted feature is added to the machine model of selected features and evaluated using the objective function. Then, the feature that yielded the highest gain in the objective is selected, and the algorithm repeats until no single feature in the pool yields gain. The algorithm is presented in pseudocode in Algorithm 1. The following sections discuss some finer details of the feature pool composition.

---

Algorithm 1: Sequential Feature Selection

```
Input: F_std;                              // baseline (standard) feature set
Input: F;                                  // candidate feature set
 1  score_std = evaluate(F_std);
 2  F_dynbase = {f ∈ F | isDynBased(f)};
 3  F_fixbase = f ∉ F_dynbase;
 4  F_static = {f ∈ F | ~hasFreeParams(f)};
 5  F = add(F_fixbase, mapToBases(F_dynbase, F_static));
 6  score_best = 0;
 7  F_best = 0;
 8  repeat
 9  |   foreach f ∈ F do
10  |   |   f_best = null;
11  |   |   F_new = add(copy(F_best), f);
12  |   |   if f ∉ F_static then
13  |   |   |   p_opt = optFreeParams(F_new);
14  |   |   |_  setFreeParams(F_new, p_opt);
15  |   |   score = evaluate(F_new);
16  |   |   if score > score_best then
17  |   |   |   score_best = score;
18  |   |   |_  f_best = f;
    |   |_
19  |   if f_best then
20  |   |   F_best = add(F_best, f_best);
```

-continued

---

Algorithm 1: Sequential Feature Selection

---

```
21 |   |  if f_best ∈ F_static then
22 |   |   |_ F = del(F, f_best);
23 |   |  F = add(F, mapToBases(F_dynbase, {f_best}));
24 |   |  if length(F_best) = length(F_std) and score_best < score_std then
25 |   |   |  F_best = F_std;
26 |   |   |_ score_best = score_std;
27 |   |   done = isempty(F);
28 |   else
29 |   |_ done = true;
30 until done;
31 if score_best < score_std then
32 |   return (F_std, score_std);
33 else
34 |_ return (F_best, score_best);
```

---

3.3 Feature Parameter Optimization

Features extracted from images may have input parameters that determine operation. For example, the scale space feature has a standard deviation parameter [20]. These parameters can have a large effect on the accuracy of the classifier [18]. As such, multidimensional optimization can be used to search for a set of feature parameter values that maximize an objective metric over some set of continuous parameter ranges. Feature parameter optimization attempts to maximize the objective over some given feature parameter space. The parameters within this space are referred to as free parameters.

Because the objective function is a possibly non-linear and non-differentiable function of the free feature parameters, black-box global optimization algorithms such as the Nelder-Mead method are best suited for finding optimal parameter sets [16]. The Nelder-Mead method is a simplex heuristic method which performs a search for objective maxima in a multidimensional space. When a machine model is used to evaluate a parameterized feature in the feature pool, the Nelder-Mead method is used to reduce the objective function of the parameter space to a single maxima.

Feature parameter optimization takes place in Algorithm 1, line 13. Note that once a parameterized feature is selected by the greedy algorithm, the optimal parameters for that particular feature instance are no longer free parameters for the machine model. However, future instances of the same feature type are still explored during feature extraction.

3.4 High-Order Feature Extraction

We refer to image features that are extracted through convolution, such as scale space and the Gabor filter, as high-order features because they may use a base image raster in order to conduct feature extraction. In addition to feature parameter optimization, disclosed embodiments allow for the optimizer to explore new bases for convolution based on all features in the feature pool as shown in Algorithm 1, line 23. The rational for this recursive technique assumes that a selected feature instance exhibits high gain towards the objective and thus may be advantageous to process further. These features are marked as dynamically based. Initially, a dynamic-based feature will convolve with all first-order features in the feature pool as shown in Algorithm 1, line 5). Subsequently, the feature pool will be expanded with dynamic based features convolving with any dynamic-based feature previously chosen by the greedy sequential feature selection.

4 Experimentation

In order to assess the performance of the disclosed HMT optimization techniques, experiments are defined to mimic an HMT digitizing the nearshore region of a coastal dataset. The dataset consists of 50 orthorectified 10-minute time-exposed images taken from 1-20 Jan. 2016 from the Duck, NC Argus dataset [8]. Images within this span in the original Argus data that were not clear either due to darkness or error in capture were removed. The imagery spans 2,000 meters along the shoreline with a 500 meter swath, and the time of imagery spans throughout the daytime, with some consecutive images spanning a single day. The imagery contains a pier, vegetation, glare from the sun at various times, and burned in textual information as shown in FIG. 4. The time period was chosen due to the varying weather events that caused an especially dynamic nearshore region with dozens of images containing active surf zones and rip currents. Ground truth was collected by several analysts in order to collect the correctness thresholds for shore at 2 pixels and surf at 12 pixels.

4.1 Optimization of Machine Models

For experimentation, images are digitized in chronological order from cold start. Vertex insertion points are fixed to a single ground-truth set for consistency. In some embodiments, vertex insertions occur from left-to-right for each image. Intra-image training is done on all search space pixels' feature vectors for correct vertex placement (Algorithm 2 Line 11), while all inter-image training is done 1% using uniform random sampling of image pixels' feature vectors unless optimization occurs (Algorithm 2 Line 13).

---

Algorithm 2: Evaluate Machine Model on Ground Truth

---

```
Input: type_opt
Input: Δ_opt
 1 foreach image do
 2 |   checkpoint(classifier);
 3 |   foreach vertex do
 4 |   |   v = machinePlacement(vertex_x);
 5 |   |   v(i_vert) = v;
 6 |   |   if |v − vertex| > threshold then
 7 |   |   |   v = vertex ;
 8 |   |   |   c(i_vert) = 1 ;
 9 |   |   else
10 |   |   |_ c(i_vert) = 0 ;
11 |   |_ train(v);
12 |   rollback(classifier);
13 |   train(image);
14 |   if (i_img mod Δ_opt) = 0 then
15 |   |   switch type_opt do
16 |   |   |   case CLEAR do
17 |   |   |   |_ coldStart(classifier);
18 |   |   |   case CONVENTIONAL do
19 |   |   |   |   optimizeConvObjective(classifier);
20 |   |   |   |_ coldStart(classifier);
21 |   |   |   case CIS do
22 |   |   |   |   optimizeCISObjective(classifier);
23 |   |   |   |_ coldStart(classifier);
       |   |   |_
       |   |_
       |_
24 return v, c;
```

---

This is done to create diversity in the training data, which disclosed embodiments have observed to reduce bias. To accommodate the difference in training samples, the classifier implements a checkpoint/rollback capability. The feature space for the initial default machine model is set to contain the first-order features of red intensity, green intensity, blue intensity, brightness, pixel row coordinate, and pixel column coordinate. For sequential feature selection during optimization, the initial feature pool consists of the default features along with the second order features of scale space and the Gabor filter. Table 1 details the ranges of any free parameters and the values of any fixed parameters for these second order features.

TABLE 1

| Feature sets | | |
|---|---|---|
| Default | Optimizer Pool (Shore) | Optimizer Pool (Surf) |
| Row coordinate | Row coordinate | Row coordinate |
| Column coordinate | Column coordinate | Column coordinate |
| Red | Red | Red |
| Green | Green | Green |
| Blue | Blue | Blue |
| Brightness | Brightness | Brightness |
| | Scale Space: | Scale Space: |
| | base = dynamic | base = dynamic |
| | scale = [0.1, 20] | scale = [10, 100] |
| | Gabor: | Gabor: |
| | base = dynamic | base = dynamic |
| | $\lambda = [2, 30]$ | $\lambda = [10, 100]$ |
| | $\varphi = [-90, 90]$ | $\varphi = [-90, 90]$ |
| | $\theta = (70, 110)$ | $\theta = (70, 110)$ |
| | $\sigma = 1, \alpha = 1$ | $\sigma = 1, \alpha = 1$ |

Figure 6:
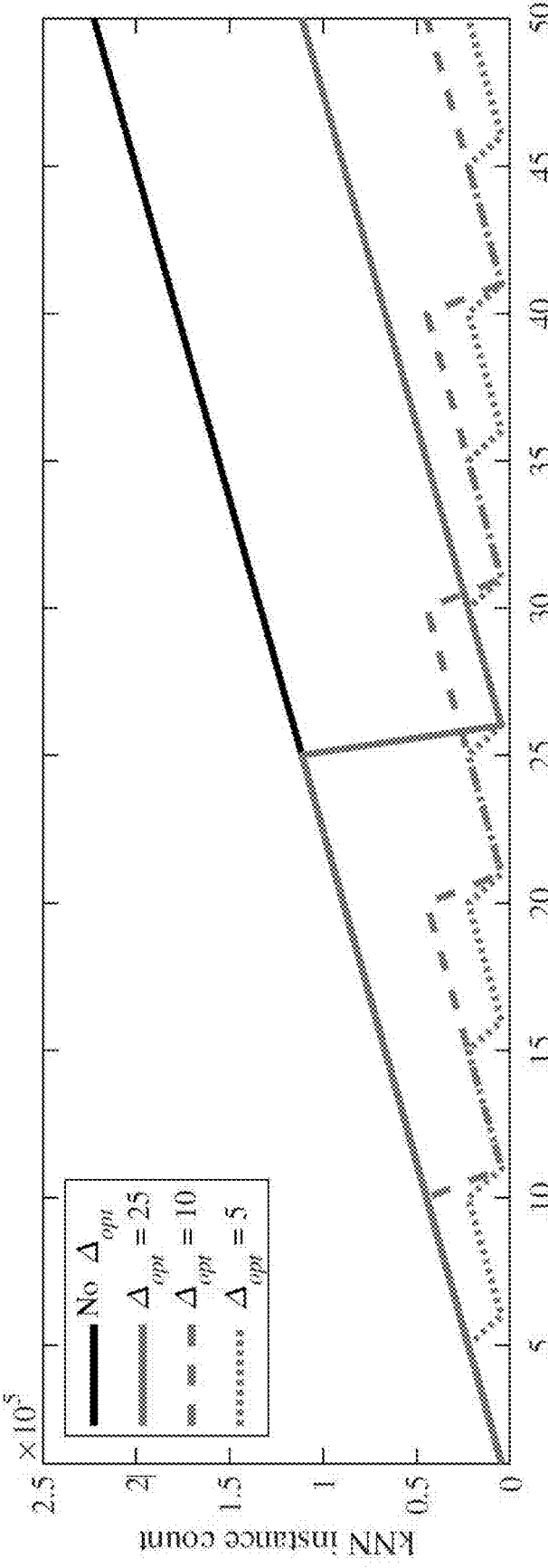
FIG. 6 illustrates a graph showing example instance counts in accordance with one or more disclosed aspects.

Optimization is considered at 5-, 10-, and 25-image periods for the conventional optimization technique and CIS technique. A technique that simply clears the learner at each cycle while maintaining, in one example, only the initial first-order features in the machine model is also considered. Disclosed embodiments refer to the combination of one of these techniques and one of these periods as an optimizer, each denoted as clear5, clear15, clear25, conv5, conv10, conv15, cis5, cis10, and cis15 (or shortened further to clear5,10,25, conv5,10,25 and cis5,10,25). During optimization, in one example, only the feature vectors of images within the respective periods are considered for both the sand and surf classes. After optimization, a new machine model is designated at cold start for each of these classes and the old machine model is no longer used. This allows for the scaling of the instance-based learner, as features become richer while instance counts are maintained, as shown in FIG. 6.

4.2 Online Heuristic for Optimizer Selection

In order to more generally compare the conventional optimization to CIS optimization, disclosed embodiments additionally present results for a simple online heuristic with the goal of selecting the best machine model for every image during experimentation. One implementation chooses amongst machine models generated by the conventional optimizers, conv5,10,25, while the other chooses amongst those generated by CIS optimization, cis5, 10,25. Each implementation will choose the best machine model based on the accuracy of placements given a vertex placement history window size, which is chosen as the independent variable used for experimentation. The details of the heuristic are provided as Algorithm 3.

---

Algorithm 3: Evaluate Heuristic Window on Ground Truth

Input: $V = \{v_1, \ldots, v_n\}$
Input: $C = \{c_1, \ldots, c_n\}$
1  $n_{corr} = 0$;
2  foreach vertex do
3      $\mid$  $m = \underset{x}{\arg\min}\ sum\big(C_x(\text{vertex}_{i-Delta_v} \ldots\ \text{vertex}_{i-1})\big)$;
4      $\mid$  $v = V_m(\text{vertex}_i)$;
5      $\mid$  if $|v - \text{vertex}| > $ threshold then
6          $\mid$   $\mid$   $n_{corr} + = 1$;
7  return $n_{corr}$;

---

5 Results

TABLE 2

| | | | Vertex placement accuracy by optimization configuration | | | | | | | | | |
|---|---|---|---|---|---|---|---|---|---|---|---|---|
| Type | | | clear | | | conv | | | | cis | | |
| Interval | base | 25 | 10 | 5 | 25 | 10 | 5 | hrst | 25 | 10 | 5 | hrst |
| Shore | 69.0 | 72.7 | 70.2 | 70.7 | 74.3 | 69.1 | 71.1 | 74.7 | 75.1 | 68.3 | 67.6 | 75.3 |
| Surf | 60.0 | 62.3 | 70.9 | 72.2 | 72.3 | 76.4 | 73.5 | 78.4 | 72.8 | 77.0 | 72.9 | 70.0 |
| Overall | 64.8 | 67.9 | 70.6 | 71.4 | 73.4 | 72.5 | 72.2 | 76.4 | 74.0 | 72.3 | 70.0 | 77.0 |

FIG. 7 shows results for the vertex placement performance of the optimizers. For comparison, a baseline machine model that, in one example, only uses the set of first-order features and retains all instances is shown. Recall that both the conv and cis optimizers use greedy sequential feature selection while the clear optimizer, in one example, only uses the set of first-order features and clears all instances at every period denoted by a symbol in the plot. Intuitively, the shore vertex placements might not be as susceptible to concept drift as the features of the shoreline in time-exposed imagery are robust to weather events. However, the features of the surf zone boundary are much more variant under weather-related events and thus are expected to be anomalous under such events. This assessment is strengthened by several observations: The baseline performs more comparably to other implementations for the shoreline placement, forgetting and optimization yields an almost 50% reduction in misplaced vertices for the surf placement, and the 25-period optimizers perform much better for shore than for surf. Overall, the single best performing optimizer is cis25, which yielded a 74.0% vertex placement accuracy across the entire dataset. Compare this to the baseline accuracy of 64.8% and the best performing conventional optimization technique conv25 which yielded a 73.4% accuracy. Though the best performing optimizers for both shore and surf are CIS optimizers, the worst performing optimizer is the cis5 optimizer, which suggests that CIS optimization, though more robust, may favor slightly longer periods to yield more performant machine models.

Results for the online heuristic for optimizer selection are shown in FIG. 8. The number of correct vertex placements is shown with respect to the window size analyzed by the heuristic. Two heuristic implementations are considered: One containing all three conventional optimizers and one containing all three CIS optimizers. In almost every case, the heuristic using $cis_{5,10,25}$ outperformed its $conv_{5,10,25}$ counterpart. In the most performant case where the window size is set to 48 vertex placements for shoreline and 44 placements for surf, the heuristic using CIS optimization performed 66 more correct placements than the heuristic using conventional optimization, yielding a vertex placement accuracy of 77.0%. However, the window size sensitivity is high for this simple heuristic, and thus the optimal window size is difficult to predict. When comparing the sensitivity of results across all window sizes, the heuristic using conventional optimization yielded a variance of 56.8 while the heuristic using CIS optimization yielded a variance of 28.9. This implies that CIS optimization might not only be more precise, but generally more reliable and robust than conventional optimization. The accuracy of the best performing heuristic implementations are given in the hrst columns of Table 2. The heuristic implementation outperformed any single interval implementation of its relevant counterpart method, and overall, the CIS heuristic results outperform everything else.

FIGS. 9-11 illustrate an exemplary feature space optimization process 900 in accordance with disclosed aspects.

Disclosed aspects provide for the freedom to fundamentally change the make-up of feature space. According to some aspects, the optimizer starts with zero and builds up feature space (selects features is very relevant to the problem, and rejects feature that might not be impactful). According to some aspects, it can generate new features through parameter optimizations of complex higher-order features. As shown, feature candidates ① are individually optimized using a novel technique called compositional interface schemata (CIS) optimization ②. In some cases, the most beneficial to the current feature space is then selected ③ and added to the space ④. The newly selected feature is then used ⑤ to enrich the candidate feature pool with new derivative features. The entire process can repeat until no further improvement to the feature space can be achieved.

Compositional interface schemata (CIS) represents a novel objective for the optimization of candidate features. Rather than evaluating the accuracy of how well the classifier is able to classify pixels in the image, the CIS optimizer instead evaluates the accuracy of a machine teammate correctly placing the vertices during digitization. To our knowledge no prior published study has addressed the use of such algorithms to improve ML model optimization.

Newly optimized features added to the feature space can be used as the basis of new features. By applying beneficial operations (e.g. blur, edge detect, and/or the like), new candidate features can be added for consideration in future optimize/selection cycles, such as illustrated in FIG. 13.

The new candidate features increase the likelihood of further improvements to the overall feature space.

Created features often represent features that a human might not have previously considered. According to some aspects, some features operate on another feature's data, such as Blur on Red Channel, Blur on Green Channel, Blur on Edge Detect on Blue Channel, and/or the like. In some cases, features can have a basis that can be dynamically constructed from a pool of basis features. For example: optimizer looks at different levels at blur accounting for vertexes, feature selector picks the one that works best, human might not have previously considered→green channel of the image and Gabor filter.

By optimizing a feature space for accuracy in machine teammate placement of vertices as opposed to the more traditional evaluation of pixel classification, the CIS optimization technique is able to produce a more accurate and productive HMT.

The ability to generate new features as optimized features are selected greatly expands the possible feature space beyond what would normally be available. This leads to enriched feature sets that achieve high accuracy with fewer features.

FIG. 29 illustrates an example method 2900, in accordance with one or more disclosed aspects. Step 2902 may include receiving, by a processing device, a set of one or more images, each of the one or more images comprising one or more sets of pixels. Step 2904 may include receiving, by the processing device, a ground truth value associated with each the one or more sets of pixels, wherein each ground truth value identifies a vertex point associated with a transition between two regions in the respective set of pixels. Step 2906 may include configuring, by the processing device, a set of one or more dynamic based features associated with each of the one or more images and a set of one or more basis features associated with each of the one or more images. Step 2908 may include mapping, by the processing device, the set of dynamic based features onto the basis features. Step 2910 may include generating, by the processing device, a set of candidate features based on the mapping. Step 2912 may include identifying, by the processing device, a machine placement candidate vertex point for a first set in the set of one or more sets of pixels. Step 2914 may include determining, by the processing device, a set of one or more selected candidate features in the set of candidate features that maximizes an objective function, wherein the objective function identifies an accuracy of the identified machine placement candidate vertex point compared to the respective ground truth for a respective set of pixels. Step 2916 may include updating, by the processing device, the set of one or more basis features by adding the set of one or more selected candidate features that maximizes the objective function. Step 2918 may include training, by the processing device, a machine learning model based on the updated set of one or more basis features. Step 2920 may include identifying, by the processing device, based on the trained machine learning model, a set of additional one or more vertex points associated with a transition between two regions in a respective set of pixels. Step 2922 may include determining, by the processing device, a boundary interface between the two regions in the respective set of pixels based on the set of additional one or more vertex points. One or more steps may be repeated, added, modified, and/or excluded.

According to some aspects, one or more disclosed embodiments may have one or more specific applications. According to some aspects, one or more disclosed aspects may be used to facilitate a water-based operation. In some cases, disclosed aspects may provide information (e.g., identification a shore line, water-based interfaces, land/water interfaces, air/water/land interfaces, other interfaces, transitions, regions, etc. in images, and/or the like), and in some cases the additional information may be used for search & rescue, for safety of navigation, for military situational awareness, for implementing and/or developing a mission route plan associated with operating a vehicle, aircraft, vessel, and/or the like. In some cases, one or more disclosed aspects may be used to facilitate a strategic operation, which can include a defensive tactical operation or naval operation.

One or more aspects described herein may be implemented on virtually any type of computer regardless of the platform being used. For example, as shown in FIG. 30, a computer system 3000 includes a processor 3002, associated memory 3004, a storage device 3006, and numerous other elements and functionalities typical of today's computers (not shown). The computer 3000 may also include input means 3008, such as a keyboard and a mouse, and output means 3012, such as a monitor or LED. The computer system 3000 may be connected to a local may be a network (LAN) or a wide may be a network (e.g., the Internet) 3014 via a network interface connection (not shown). Those skilled in the art will appreciate that these input and output means may take other forms.

Further, those skilled in the art will appreciate that one or more elements of the aforementioned computer system 3000 may be located at a remote location and connected to the other elements over a network. Further, the disclosure may be implemented on a distributed system having a plurality of nodes, where each portion of the disclosure (e.g., real-time instrumentation component, response vehicle(s), data sources, etc.) may be located on a different node within the distributed system. In one embodiment of the disclosure, the node corresponds to a computer system. Alternatively, the node may correspond to a processor with associated physical memory. The node may alternatively correspond to a processor with shared memory and/or resources. Further, software instructions to perform embodiments of the disclosure may be stored on a computer-readable medium (i.e., a non-transitory computer-readable medium) such as a compact disc (CD), a diskette, a tape, a file, or any other computer readable storage device. The present disclosure provides for a non-transitory computer readable medium comprising computer code, the computer code, when executed by a processor, causes the processor to perform aspects disclosed herein.

Embodiments for training machine learning model to identify geographic regions in a human-machine team have been described. Although particular embodiments, aspects, and features have been described and illustrated, one skilled in the art may readily appreciate that the aspects described herein are not limited to only those embodiments, aspects, and features but also contemplates any and all modifications and alternative embodiments that are within the spirit and scope of the underlying aspects described and claimed herein. The present application contemplates any and all modifications within the spirit and scope of the underlying aspects described and claimed herein, and all such modifications and alternative embodiments are deemed to be within the scope and spirit of the present disclosure.

REFERENCES

1. Aha, D. W., Bankert, R. L.: A comparative evaluation of sequential feature selection algorithms. In: Learning from data, pp. 199-206. Springer (1996)
2. Alekseev, A., Bobe, A.: Gabornet: Gabor filters with learnable parameters in deep convolutional neural network. In: 2019 International Conference on Engineering and Telecommunication (EnT). pp. 1-4. IEEE (2019)
3. Elhamifar, E., Sapiro, G., Yang, A., Sasrty, S. S.: A convex optimization framework for active learning. In: Proceedings of the IEEE International Conference on Computer Vision. pp. 209-216 (2013)
4. Gabor, D.: Theory of communication, part 1: The analysis of information. Journal of the Institution of Electrical Engineers-Part III: Radio and Communication Engineering 93 (26), 429-441 (1946)
5. Gama, J., ˇZliobait'e, I., Bifet, A., Pechenizkiy, M., Bouchachia, A.: A survey on concept drift adaptation. ACM computing surveys (CSUR) 46 (4), 1-37 (2014)
6. Hastie, T., Tibshirani, R., Friedman, J.: The elements of statistical learning: data mining, inference, and prediction, chap. 7, pp. 241-245. Springer Science & Business Media (2009)
7. Holman, R.: Nearshore processes. Reviews of Geophysics 33 (S2), 1237-1247 (1995)
8. Holman, R. A., Stanley, J.: The history and technical capabilities of argus. Coastal engineering 54 (6-7), 477-491 (2007)
9. Hossain, M. D., Chen, D.: Segmentation for object-based image analysis (obia): A review of algorithms and challenges from remote sensing perspective. ISPRS Journal of Photogrammetry and Remote Sensing 150, 115-134 (2019)
10. Keller, J. M., Gray, M. R., Givens, J. A.: A fuzzy k-nearest neighbor algorithm. IEEE transactions on systems, man, and cybernetics (4), 580-585 (1985)
11. Kirby, S., Hurford, J. R.: The emergence of linguistic structure: An overview of the iterated learning model. Simulating the evolution of language pp. 121-147 (2002)
12. Kotaridis, I., Lazaridou, M.: Remote sensing image segmentation advances: A meta-analysis. ISPRS Journal of Photogrammetry and Remote Sensing 173, 309-322 (2021). https://doi.org/https://doi.org/10.1016/j.isprsjprs.2021.01.020, https://www.sciencedirect.com/science/article/pii/S0924271621000265
13. Meshgini, S., Aghagolzadeh, A., Seyedarabi, H.: Face recognition using gabor filter bank, kernel principle component analysis and support vector machine. International Journal of Computer Theory and Engineering 4 (5), 767 (2012)
14. Michael, C. J., Dennis, S. M., Maryan, C., Irving, S., Palmsten, M. L.: A general framework for human-machine digitization of geographic regions from remotely sensed imagery. In: Proceedings of the 27th ACM SIGSPATIAL International Conference on Advances in Geographic Information Systems. pp. 259-268. SIGSPATIAL'19 (2019)
15. Nargesian, F., Samulowitz, H., Khurana, U., Khalil, E. B., Turaga, D. S.: Learning feature engineering for classification. In: Ijcai. vol. 17, pp. 2529-2535 (2017)
16. Nelder, J. A., Mead, R.: A simplex method for function optimization. Computation J 7, 308-313 (1965)
17. Palmsten, M. L., Brodie, K. L.: The coastal imaging research network (cirn). Remote Sensing 14 (3), 453 (2022)
18. Probst, P., Bischl, B., Boulesteix, A. L.: Tunability: Importance of hyperparameters of machine learning algorithms. arXiv preprint arXiv: 1802.09596 (2018)
19. Wilder, B., Horvitz, E., Kamar, E.: Learning to complement humans. arXiv preprint arXiv: 2005.00582 (2020)
20. Witkin, A. P.: Scale-space filtering. In: Readings in Computer Vision, pp. 329-332. Elsevier (1987)

What is claimed is:

1. A method comprising receiving, by a processing device, a set of one or more images, each of the one or more images comprising one or more sets of pixels;

receiving, by the processing device, a ground truth value associated with each of the one or more sets of pixels, wherein each ground truth value identifies a vertex point associated with a transition between two regions in the respective set of pixels;

configuring, by the processing device, a set of one or more dynamic based features associated with each of the one or more images and a set of one or more basis features associated with each of the one or more images;

mapping, by the processing device, the set of dynamic based features onto the basis features;

generating, by the processing device, a set of candidate features based on the mapping;

identifying, by the processing device, a machine placement candidate vertex point for a first set in the one or more sets of pixels;

determining, by the processing device, a set of one or more selected candidate features in the set of candidate features that maximizes an objective function, wherein the objective function identifies an accuracy of the identified machine placement candidate vertex point compared to the respective ground truth for a respective set of pixels;

updating, by the processing device, the set of one or more basis features by adding the set of one or more selected candidate features that maximizes the objective function;

training, by the processing device, a machine learning model based on the updated set of one or more basis features;

identifying, by the processing device, based on the trained machine learning model, a set of additional one or more vertex points associated with the transition between the two regions in a respective set of pixels; and determining, by the processing device, a boundary interface between the two regions in the respective set of pixels based on the set of additional one or more vertex points.

2. The method of claim 1, wherein the objective function determines a distance between the identified machine placement candidate vertex point and the respective ground truth for a respective set of pixels.

3. The method of claim 2, wherein responsive to the distance being within threshold value, determining to select the corresponding candidate feature as a selected candidate feature, and wherein responsive to the distance being outside of the threshold value, discarding the corresponding candidate feature.

4. The method of claim 2, wherein the distance is normalized by a maximum possible total correction distance across a plurality placements associated with machine placement candidate vertex points to produce a fractional component that adds to a raw number of machine-related corrections.

5. The method of claim 1, further comprising further training the machine learning model based on a determination of whether the additional one or more vertex points are outside of a correction threshold.

6. The method of claim 1, wherein responsive to the additional one or more vertex points being outside of a correction threshold, correcting the additional one or more vertex points to a corresponding ground truth value.

7. The method of claim 6, wherein one or more pixels located above the corrected additional one or more vertex points are labeled as being associated with a first region of the two regions, and pixels located below the corrected additional one or more vertex points are labeled as being associated with a second region of the two regions.

8. The method of claim 7, further comprising:

further training the trained machine learning model based on the correction; and identifying, based on the further trained machine learning model, a subsequent machine placement candidate vertex point for a second set in the set of one or more sets of pixels.

9. The method of claim 1, wherein determining, by the processing device, the set of one or more selected candidate features in the set of candidate features that maximizes the objective function comprises individually evaluating features from the generated set of candidate features with a currently accepted feature set to find an addition feature that maximizes the objective function through a greedy sequential feature selection algorithm.

10. The method of claim 1, wherein determining, by the processing device, the set of one or more selected candidate features in the set of candidate features that maximizes the objective function comprises maximizing the objective function over a given feature parameter space that includes free parameters.

11. The method of claim 1, further comprising repeating the determining and updating steps until an exit criteria associated with the transition between two regions is met.

12. The method of claim 1, wherein configuring the set of the one or more dynamic based features further comprises implementing a Gabor filter having at least one fixed parameter and at least one optimizable free parameter, wherein optimization of the free parameter maximizes the objective function.

13. The method of claim 1, wherein the objective function comprises a compositional interface schemata (CIS) objective function.

14. The method of claim 13, wherein determining the set of one or more selected candidate features comprises selecting the candidate features based on optimizing free parameter values that maximizes the CIS objective function.

15. The method of claim 1, wherein each ground truth value identifies a constraint space of one or more pixels, wherein a placement of the identified machine placement candidate vertex point is constrained to the one or more pixels associated with the respective constraint space.

16. The method of claim 1, wherein a first region of the two regions comprises land, and a second region of the two regions comprises water.

17. The method of claim 1, wherein the identified machine placement candidate vertex point is based on a machine learning model classifier associated with a feature space, wherein the feature space is initially empty.

18. The method of claim 1, wherein the determining the set of one or more selected candidate features comprises using a Nelder-Mead method to find one or more optimal parameters associated with the set of candidate features that maximize the objective function.

19. The method of claim 18, wherein the objective function is a non-linear function of free feature parameters.

20. The method of claim 19, wherein the objective function is non-differential function of free feature parameters.

21. The method of claim 1, further comprising performing a water-based operation based on the determined boundary interface between the two regions in the respective set of pixels.

* * * * *